(12) United States Patent
Wuthnow et al.

(10) Patent No.: US 8,406,252 B1
(45) Date of Patent: Mar. 26, 2013

(54) PRESENCE-BASED NETWORK SERVICE AVAILABILITY ANNOUNCEMENTS

(75) Inventors: Mark Wuthnow, Austin, TX (US); Jasminka Dizdarevic, Austin, TX (US); Matthew Wayne Stafford, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 500 days.

(21) Appl. No.: 11/696,852

(22) Filed: Apr. 5, 2007

(51) Int. Cl.
*H04J 3/16* (2006.01)
*H04L 12/56* (2006.01)
*H04L 12/28* (2006.01)
*H04L 12/42* (2006.01)
*G06F 15/16* (2006.01)

(52) U.S. Cl. .......................... 370/466; 709/206; 709/227

(58) Field of Classification Search .................. 370/231, 370/264, 351, 358, 401, 389, 392; 379/90.01, 379/93.07, 58, 59, 63, 88.18, 114.01; 709/227, 709/238
See application file for complete search history.

(56) References Cited

U.S. PATENT DOCUMENTS

| | | | |
|---|---|---|---|
| 5,938,735 A * | 8/1999 | Malik ............................ | 709/238 |
| 6,222,924 B1 * | 4/2001 | Salomaki ...................... | 380/200 |
| 6,731,625 B1 | 5/2004 | Eastep et al. | |
| 7,184,423 B2 * | 2/2007 | Bryan et al. .................. | 370/338 |
| 2003/0095555 A1 | 5/2003 | McNamara et al. | |
| 2003/0179865 A1 * | 9/2003 | Stillman et al. ............. | 379/88.18 |
| 2004/0139043 A1 * | 7/2004 | Lei et al. ........................... | 707/1 |
| 2004/0139088 A1 * | 7/2004 | Mandato et al. ............. | 707/100 |
| 2006/0075120 A1 | 4/2006 | Smit | |
| 2007/0053513 A1 * | 3/2007 | Hoffberg ....................... | 380/201 |
| 2008/0004904 A1 * | 1/2008 | Tran ................................. | 705/2 |
| 2008/0113646 A1 * | 5/2008 | Cereceres et al. ............. | 455/405 |
| 2008/0299955 A1 * | 12/2008 | Lee et al. .................... | 455/414.1 |

OTHER PUBLICATIONS

International Search Report and Written Opinion dated Jun. 26, 2008 for PCT Application Serial No. PCT/US08/58725, 9 Pages.

* cited by examiner

*Primary Examiner* — Kevin C Harper
*Assistant Examiner* — Samina Choudhry
(74) *Attorney, Agent, or Firm* — Turocy & Watson, LLP

(57) ABSTRACT

Systems and methods are disclosed for detecting the availability of common features (e.g. device functions and/or subscription plan features) associated with two or more communication devices, and indicating commonly supported features to at least one of the two communication devices. Disclosed systems can include components that can audit communication devices and communication networks to determine features supported by a communication, and components that can selectively mask unsupported features and/or reveal supported features.

20 Claims, 13 Drawing Sheets

PRESENCE-BASED NETWORK SERVICE AVAILABILITY ANNOUNCEMENTS

BACKGROUND

Communication networks typically contain at least one method with which to interconnect communication devices to allow for end-to-end communication thereon. A network facilitates communication by providing a channel that allows analog and/or digital information to be shared amongst devices connected to the channel. A channel can take various forms, including a shielded wire capable of carrying electronic signals, (e.g., a co-axial cable wire, a copper telephone wire, etc.) or an electromagnetic signal propagating through Earth's atmosphere or through physical structures at various frequencies, (e.g., radio frequencies, microwave frequencies, and optical frequencies).

As the number of communication devices increases, the number of channels, of various forms, required to connect these devices increases as well. Simultaneously connecting large numbers of communication devices has become very costly for communication network service providers. Traditionally, either a physical wire, or portion of its bandwidth, or an electromagnetic frequency channel, and a portion of the equipment required to operate and to separate those channels, must be dedicated to each communication. Because millions of communications occur daily in populated areas of the world, and providing the resources to facilitate those communications is expensive, efforts have been expended to find ways to decrease the resources required to sustain these communication networks.

One solution to decrease the resources required to facilitate mass communication is to perform communication setup and termination procedures, sometimes referred to as initiation or signaling, over separate channels from communication channels. This procedure can be referred to as out-of-band signaling, as the signaling process is performed outside of the channel established for end-to-end device communication. Because the amount of information required for setup and termination is relatively small, a much smaller and less expensive network can provide a platform for these signaling services. One example of a modern signaling system established for the public telephone network is the Signaling System 7 (SS7) network. SS7 and its predecessor systems were initially established on circuit switched telephone networks for network security purposes. However, as mobile and Internet Protocol (IP) networks have begun to connect with each other and with telephone networks, resource-saving signaling networks, including SS7 and mobile and IP protocol counterparts, have become prominent.

In addition to providing security for network signaling procedures and reducing the resources required to setup and terminate communication channels, signaling networks also provide presence information to components connected on a signaling network. Presence information is information that can be obtained through a signaling network when a device first logs onto a communication network. One example of presence information is an indication that a device is 'present' on a network and has an ability and willingness to communicate thereon. A common example of presence is illustrated by Instant Messaging (IM) systems. IM devices can display a list of other devices that are logged onto a communication network and ready to begin communication with an IM device user. For example, a friend's list on an IM device can indicate what 'friends' of an IM device user are logged onto a network.

Presence information is generally updated and available to a network whenever a device first logs onto a network. Additional presence information can include location information, subscription information, and service information pertaining to each communication device logged onto a network. However, unlike information indicating a device is 'present', this information is generally not made available to other users until after communication has been initiated, if at all.

SUMMARY

The following presents a simplified summary of the disclosure in order to provide a basic understanding of some aspects of the full written description. This summary is not an extensive overview of the disclosure. It is not intended to identify key/critical elements of the invention or to delineate the scope of the invention. Its sole purpose is to present some concepts of the invention in a simplified form as a prelude to the more detailed description that is presented later.

The subject disclosure relates to systems and methods for playing an audio signal on a communication device to alert an originating communication device user to the existence of features associated with a receiving communication device. Device features can be determined, for example, by way of presence information obtained over a signaling network. The audio signal can be any suitable digital audio file, e.g. a ring-tone or voice recording, that can be played on a circuit switched, packet switched, or circuit and packet switched communication device. Device features can include, for example, a media service function such as streaming video, concurrent audio, IM, and similar communication data services. Device features can also include subscription plan features of a call e.g. that communication between two devices is free, pre-paid, or at a reduced rate including, e.g., a nights-and-weekends phone call, a 'mobile-to-mobile' call, an in-network phone call, including cellular to cellular, cellular to landline, and cellular to IP networks, and common provider calling including cellular, landline, IP, and other subscription communication provided by a single network provider or multiple providers having suitable call plan agreements. Lastly, a calling or called party can be alerted to the availability of media services functions or free or reduced rate plan features by playing an audio signal during, for example, a ring-back cycle of a telephone call.

In other aspects, a component of a cellular communication network can be capable of monitoring information associated with cellular telephones connected to a cellular network and/or a signaling network to determine whether requirements for media services among phones are met. The component can alert callers to the presence of available media services by playing a distinctive audio signal or voice file on the calling and/or receiving phone(s) and optionally by displaying a graphical icon on a user interface of the phone(s). In addition, a component of a cellular communication network can monitor information associated with cellular telephones connected to a cellular and/or a signaling network to determine whether requirements for free or special rate calling features have been met. The component can alert callers to the presence of free or special rate features when a phone call is initiated by playing a distinctive audio signal or voice file on the calling and/or receiving phone(s), and optionally by displaying a graphical icon on a user interface display of the phone(s).

In addition, the subject disclosure relates to systems and methods for announcing the presence of media service functions or special rate calling features by referencing a user profile. A user profile can specify media service functions that a device should utilize, if available, and other media service functions that should not be utilized. A component of a communication network can selectively mask and display available media service functions according to service requirements and a user profile. For example, if a device user wishes to utilize streaming video but not IM services, and the telephone and network requirements are met for both streaming video and IM services on a particular phone call, a network component can indicate to a calling device that streaming video services are available, but mask the fact that IM services are available.

Another aspect of the subject disclosure relates to components for recording and saving media when a media service function is not available for a particular communication. For example, if an originating communication device can support a streaming video function, but a communication network involved in connecting an originating device and receiving device cannot support streaming video, a media recording component can record and save video captured by the originating device. Saved video can then be transmitted to a receiving device when a connection with a communication network supporting streaming video can be established. Alternatively, saved video can be transmitted to a receiving device by an alternate mechanism, e.g. e-mail.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
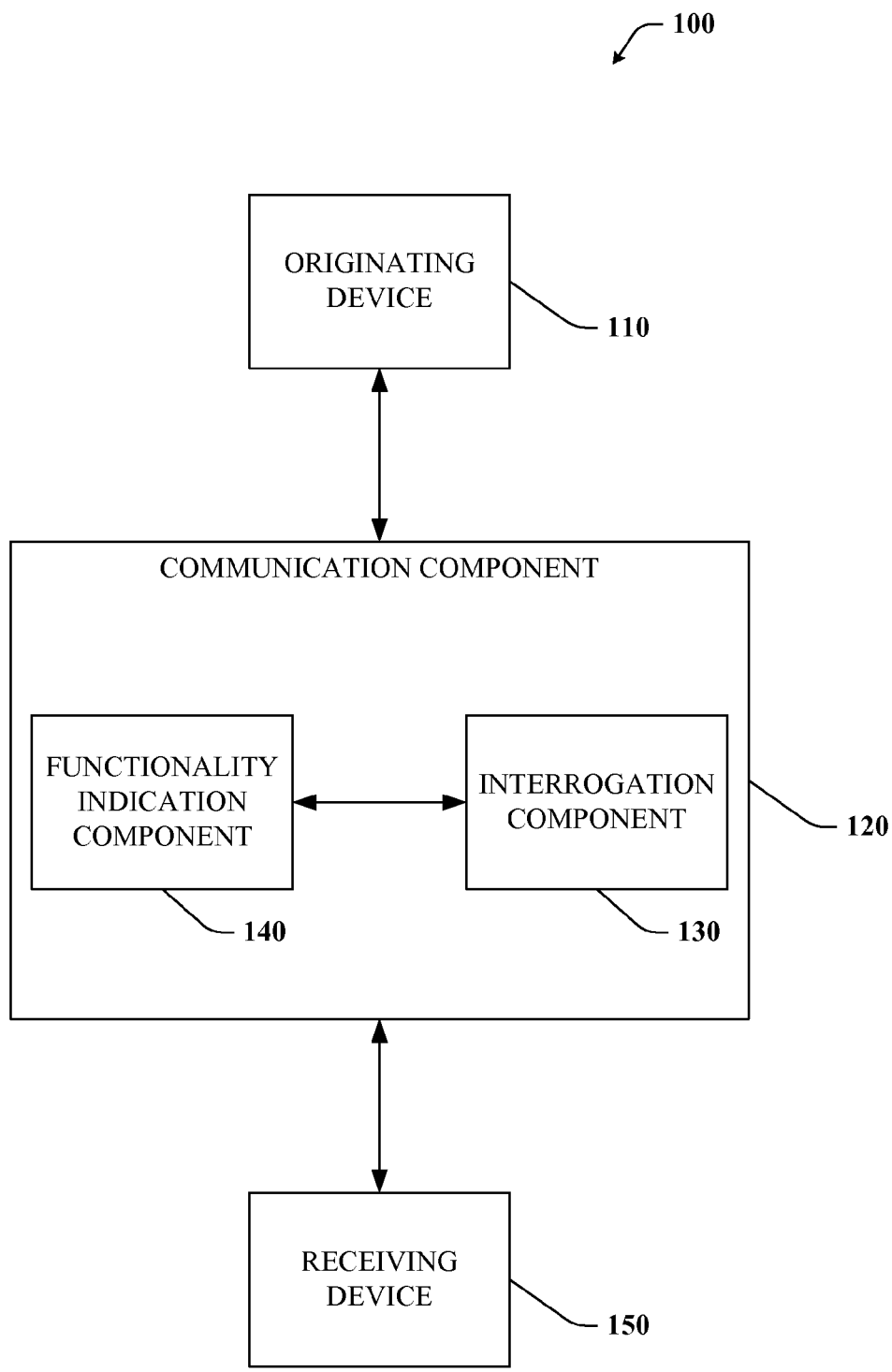
FIG. 1 is a high-level block diagram of a system for determining and displaying functionality available for communication between two particular devices in accordance with the subject innovation.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring now to FIG. 1, a system 100 is disclosed for detecting and indicating functionality of communication devices. Originating device 110 and receiving device 150 can be any suitable communication device including, for example, a cellular telephone, computer, personal digital assistant (PDA), landline telephone, satellite telephone, or similar device that can transmit and receive voice and/or data information, including devices that can transmit simultaneous voice and data information, by way of a communication network. Communication component 120 is a component or components of a communication device or one or more communication networks that can effectuate or partially effectuate communication between two or more communication devices. Communication component 120 can be a subset of at least one communication device, network, and/or combinations of networks and devices (e.g. a cellular network, a signaling or session initiation network, IP network, telephone network, intranet, the Internet, an ad hoc network between two or more communication devices, and subsets and/or combinations thereof) that can interconnect at least two communication devices.

Interrogation component 130 can query originating and receiving communication devices to identify features associated with devices. Such device-related features can include media transfer functions, user alert and/or indication functions, subscription plan features, and user display and gaming functions etc. For example, media transfer functions can include voice communication capability, data and media transmission capability, such as streaming video, concurrent audio, IM, e-mail, text messaging, and the like. Subscription plan features can include any suitable communication sponsored by a communication service provider and grouped according to a particular structure for pricing and/or service availability purposes. More specifically, subscription plan features can include, for example, free and/or reduced pricing structures for certain communication including nights-and-weekend plans, in-network plans, mobile-to-mobile plans, in-plan mobile to landline communication, in-plan mobile to wired IP communication, communications with a single provider or multiple providers having suitable shared plan agreements, etc. Interrogation component 130 can further query a network that a communication device is connected to, or networks and/or communication components involved in forming a connection between two or more devices, to determine voice and/or data transfer capabilities of those networks and components, subscription plan features supported by a network, and/or subscription plan features associated with devices connected on a network. It should be appreciated that interrogation component 130 can be a component of a communication network, of a communication device, combinations thereof, and/or separate components.

Functionality indication component 140 can be a component of a communication network and/or a communication device, and can selectively screen and reveal features of communication devices to indicate to a communication device user features that are common between the devices. Functionality indication component 140 can further selectively screen and reveal features supported by communication networks and/or components involved in connecting two or more communication devices to indicate to a communication device user supported features for a particular communication. Interrogation component 130 can send results of a device and/or network audit to functionality indication component 140, specifying the features that devices, components and networks participating in a communication can support. Functionality indication component 140 can parse those results to determine features common to all networks, devices, and components.

For example, an originating device, $device_O$ (that can include, e.g., originating device 110) is connected to a communication network, and initiates communication with a receiving device, $device_R$ (that can include, e.g., receiving device 150). Communication network components, such as interrogation component 130, can access information about $device_R$ including, for example, location of $device_R$, communication features associated with $device_R$ (e.g. media functions including streaming video, concurrent audio, IM, e-mail, picture sharing, RF-enabled, Blue-tooth enabled, etc.) and subscription plan features associated with $device_R$. This information can be determined prior to establishing a dedicated communication channel between $device_O$ and $device_R$, (e.g. by way of a signaling network). Prior to, or contemporaneous with, the establishment of a communication channel, interrogation component 130 can audit $device_O$ to determine what features are supported by $device_O$ and/or included in its subscription plan. Interrogation component 130 can then audit $device_R$ to determine which of the features supported by $device_O$ can also be supported by $device_R$. Interrogation component 130 can further audit networks and network components required to provide a communication channel connecting the devices and determine which features, common to $device_O$ and $device_R$, are also supported by those components and networks.

After all necessary devices, components, and networks have been queried, interrogation component 130 can transfer the feature data it has compiled to a functionality indication component 140. Functionality indication component 140 can parse received data to identify communication networks and components required to connect $device_O$ and $device_R$, and identify features commonly supported by those networks, components, and devices. Functionality indication component 140 can then indicate to a user of $device_O$ (e.g. by way of an audio ring tone and/or voice file, a graphical icon on a user interface of a communication device, combinations thereof, etc.), that a particular feature or set of features is available for the subject communication with $device_R$. More specifically, if $device_O$, $device_R$, and all connecting networks support a streaming video media function, functionality indication component 140 can play or transmit an audio ring tone and/or voice file to $device_O$ announcing an availability of streaming video for the pending communication with $device_R$. This example is applicable to other features commonly supported by all devices and/or components necessary to effectuate those features. Furthermore, functionality indication component 140 can alert a device user by way of other indication methods and/or components, such as a functionality indicator light.

Alternatively, functionality indication component 140 can indicate to a device user that a particular feature is not available for a particular communication. If, in the previous example, $device_R$ or one of the components connecting $device_O$ and $device_R$ does not support a streaming video media function, or some other media function, then functionality indication component 140 could, for example, play or transmit an audio ring tone and/or voice file, or other indication, to alert a user of $device_O$ that streaming video, or some other media function, is not available for the communication between $device_O$ and $device_R$. The audio signal disclosed in this example and throughout the subject innovation can be any suitable analog or digital audio file (a voice recording, .wav file, mp3 file, etc.) containing voice-related information (e.g., voice recording, voice-recorded information, voice-related information, machine-generated speech, or combinations thereof) or auditory tones (e.g. a ring-tone, sounds and/or tones having distinctive meanings, etc.), or combinations of both, that can be played on a communication device. It should be noted, that although FIG. 1 depicts interrogation component 130 and functionality display component 140 included within communication component 120, they may or may not be physically or virtually located within communication component 120, and can be located within originating device 110 or receiving device 150, or altogether separate components, instead.

Figure 2:
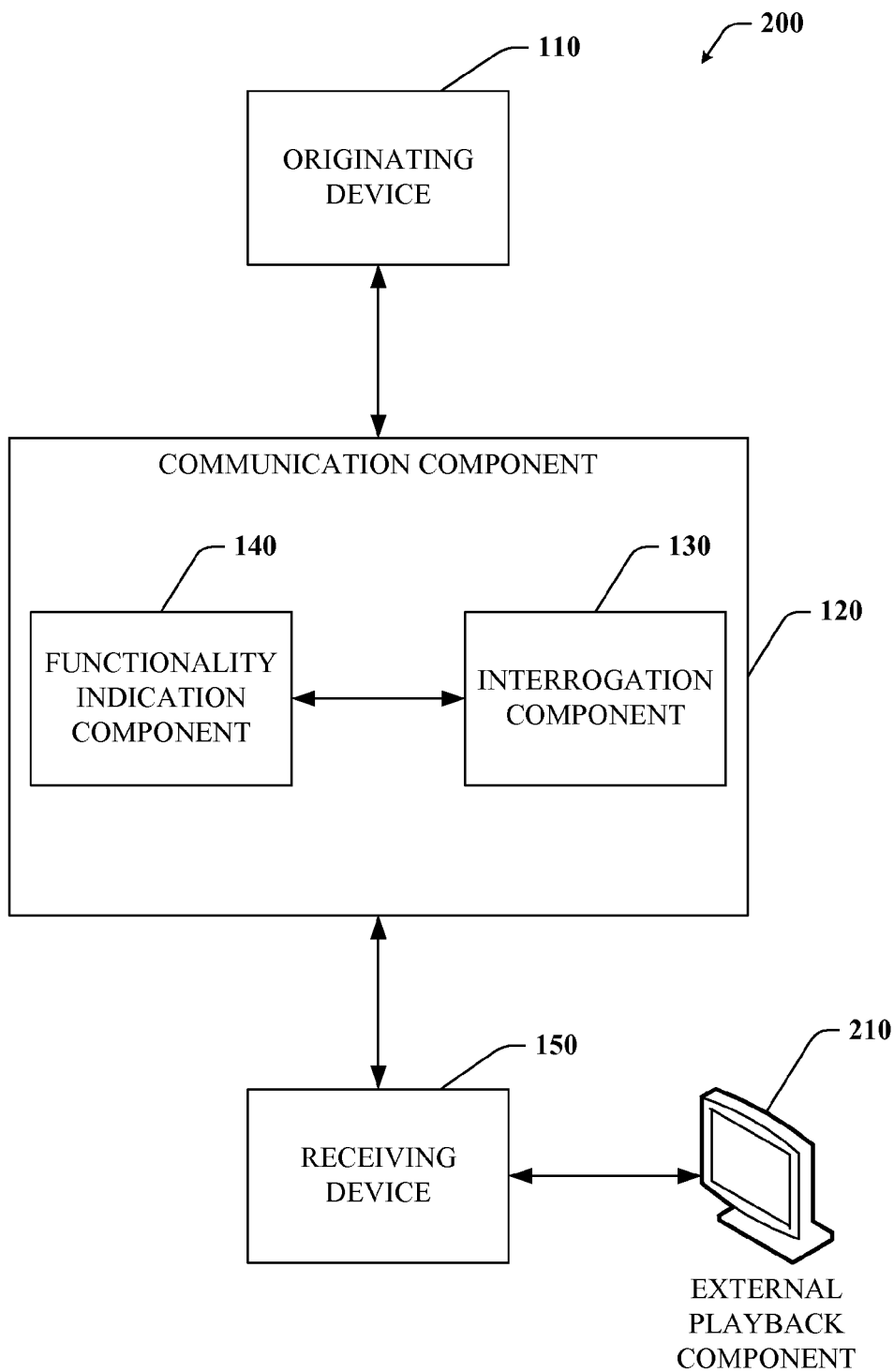
FIG. 2 illustrates a receiving device transmitting information to an external playback component in accordance with the disclosure.

Referring now to FIG. 2, an alternative aspect of the example disclosed supra is depicted in accordance with the subject innovation. Communication component 120 can create a communication channel between an originating device 110 and a receiving device 150 as described supra. An interrogation component 130 can query communication devices connected by way of the communication channel as well as communication networks and components required to effectuate the channel, to determine what features, supported by $device_O$, are also supported by those devices, networks, and components as described supra. Results of queries by interrogation component 130 are provided to functionality indication component 140, which can identify and parse devices, networks and/or components involved in creating a communication channel to identify features commonly supported by those devices, networks and/or components required to establish and maintain a channel.

If, for example, results of a query specify that originating device 110, receiving device 150, and communication component 120 all support a streaming video media function (or other feature of a communication device), then functionality indication component can alert, signal a device to alert, or both, users of an originating and receiving device (e.g. by way of an audio signal and/or file played on a device, a graphical icon indicating availability of a feature, a functionality indicator light being lit, combinations thereof, etc.) to availability of streaming video (or other feature of a communication device) for that communication. Device$_R$ could then further transmit the streaming video to an external playback component 210 for viewing. Moreover, device$_O$ can transmit streaming video sent by device$_R$ (or alternately the same streaming video captured by device$_R$ and sent to device$_R$) to an external playback component (not shown) proximate device$_O$.

External playback component 210 can be any suitable device for playing and/or displaying media (e.g. a monitor, television, mp3 player, stereo receiver, personal computer, PDA, laptop, etc.) through a wired or wireless connection. Streaming video (or other media) transmitted from one device to another and announced by functionality indication component 140 can be sent to an external device by a wired or wireless connection and/or transmission in accordance with the subject disclosure. It should be noted, that although FIG. 2 depicts interrogation component 130 and functionality display component 140 proximate to communication component 120, they may or may not be physically or virtually located proximate to communication component 120, and can be located proximate to originating device 110 or receiving device 150, or altogether separate components, instead.

Figure 3:
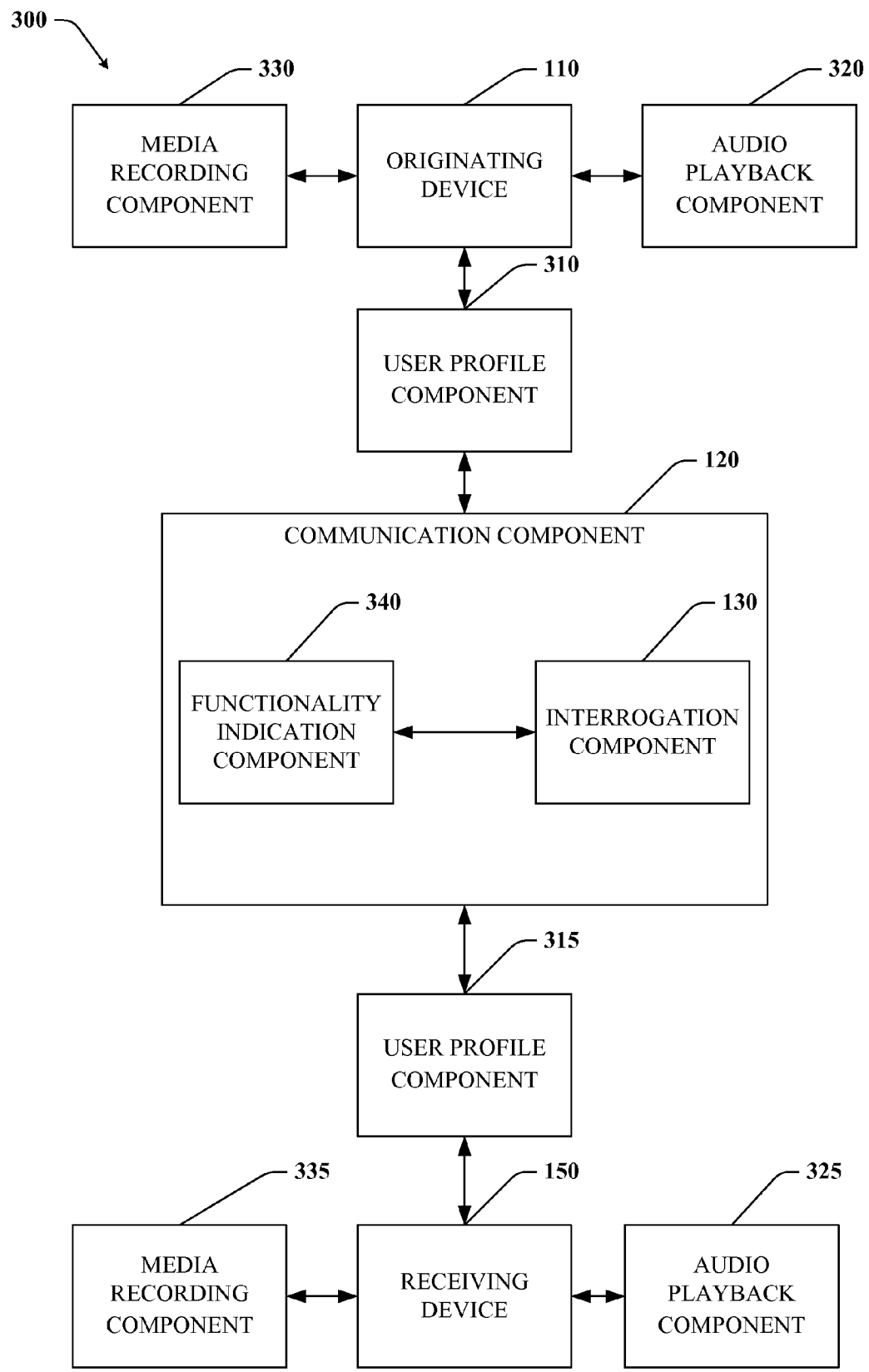
FIG. 3 illustrates a communication component referencing a user profile of originating and receiving devices in accordance with the subject disclosure.

Referring now to FIG. 3, a system 300 is depicted comprising components illustrated in FIG. 1 and additional components that can alert a device user to supported features according to a user profile. Furthermore, when a media function is not supported by all necessary devices and/or networks involved in a communication, a media recording component can record and save media. Saved media can be transmitted at another time, e.g. when all networks connecting two devices support transmission of that media type, or by way of another communication type (e.g., e-mail). Originating device 110 and receiving device 150 can be any suitable communication device including, for example, a cellular telephone, computer, personal digital assistant (PDA), landline telephone, satellite telephone, or similar device that can transmit and receive simultaneous voice and data information by way of a communication network. Communication component 120 can form a communication channel between one or more devices as described supra.

Interrogation component 130 can query originating and receiving communication devices and identify features associated with communication devices. Queries can be performed, for example, over a signaling, session initiation and/or similar network as described supra. Features associated with devices and/or communication networks can include media functions and/or subscription plan features as also described supra.

Functionality indication component 340 can be a component of a communication network, a communication device, and/or a separate entity, and can selectively screen and reveal features of communication devices, networks and components so as to indicate to a communication device user what features are common between two or more devices and supported by networks and/or components connecting them. Functionality indication component 340 can receive information about device, component, and network functions and/or subscription plan features from interrogation component 130. In addition, functionality indication component 340 can query a user-profile maintained by a user profile component (e.g. originating device user profile 310 and/or receiving device user profile 315) and selectively screen or reveal features in accord with one or more user profiles. User profile components 310 and 315 can specify a user's preferences with regard to features associated with a communication device and/or subscription plan. In particular, a user profile can specify features in which a device is permitted to participate, and features permitted to be indicated at another communication device. User profile components 310 and 315 can be created and/or updated by way of a user interface of a communication device, or an interface external to the user interface, such as a service provider's website, e-mail, a letter or form or the like.

Audio playback components 320 and 325 can play audio signals at a communication device that are stored on that device or transmitted to a device by way of an external component, such as functionality indication component 340 and/or communication component 120. Audio files can be used to alert a device user to the existence of a feature or set of features available for a particular communication. In conjunction with system 300, audio playback components 320 and 325 can alert a device user of an availability of a particular feature for a communication, by playing an audio file (e.g. a .wav file, an .mp3 file, etc.) that announces the availability of that function. For example, if functionality indication component 340 determines that concurrent audio transmission is available for a particular communication, an audio playback component can be prompted to play an audio signal indicating such availability.

Media recording components 330 and 335 can record and store media, including any suitable form of data that can be transmitted through a voice and/or data communication (e.g. video, concurrent audio sounds and/or files, text messages, e-mail messages, IM messages, etc.) Recording and saving media can be useful when, for example, a particular media transmission function is not available for a communication, yet device users still wish for media to be transmitted. Media recording components 330 and 335 can record and store data for later use (e.g., transmission at a later time).

The following example illustrates aspects of system 300. Device A is an originating device that initiates communication with a receiving device, device B. For this example, device A and device B have a streaming video function and reduced rate mobile-to-mobile subscription plan feature available, and all networks and components required to establish a communication channel between the two devices can further support those functions and rate plan features. Device A has a user profile maintained by user profile component 310 associated with device A. The user profile for device A indicates that device A should be alerted to the availability of streaming video and free mobile-to-mobile communication rates, but that all other function and rate plan availability should be screened from device A. The device A user profile further establishes that function and/or rate plan information associated with device A can be utilized to alert another communication device. Device B has a user profile maintained by user profile component 315 associated with device B. The device B user profile indicates that device B should be alerted to the availability of free mobile-to-mobile communication only, and that all other functions and rate plan features should be screened from device B. The device B user profile further establishes that other communication devices can only be alerted to an availability of mobile-to-mobile communication when communicating with device B.

When device A initiates communication with device B, interrogation component 130 will audit device A, device B, and all networks and communication components necessary to form a communication channel between the devices. The audit will determine what functions and/or rate plan features associated with device A are also available to device B and supported by intervening networks and/or components. In this example, the result of the audit will indicate that streaming video and mobile-to-mobile calling are available for the communication between device A and device B. This information is sent to functionality indication component 340.

Functionality indication component 340 parses results of an audit performed by interrogation component 130 to determine what functions and/or rate plan features are common to all connected devices, networks and components, and further checks for user profiles associated with connected devices. In this example, functionality indication component 340 checks the device A user profile, and determines that all functions and/or rate plan features associated with device A may be utilized to alert other communication devices and that device A can only be alerted to the availability of streaming video and mobile-to-mobile communication. Since both mobile-to-mobile communication and streaming video are supported by necessary entities, device A will be alerted to the availability of that function and/or rate plan feature so long as a user profile associated with device B does not prohibit the use of that function and/or feature.

In this example, however, the device B user profile indicates that device B cannot participate in streaming video and that availability of streaming video cannot be sent to other devices. So, functionality indication component 340 will only alert device A and device B to the availability of a special mobile-to-mobile communications service for this particular communication. Functionality indication component 340 can alert devices A and B in accordance with this disclosure by way of an indication component on a device, e.g. an aural, visual and/or graphical component (e.g. originating audio playback component 320 and receiving audio playback component 335). An indication component can alert a user by, for example, an audio ring tone during a ring-back cycle, a graphical icon displayed on a user interface, illuminating an indicator light on a device and/or similar mechanisms.

It should be noted that the preceding discussion of device A and device B is for exemplary purposes only and should not limit the disclosure or exclude other embodiments known or obvious, or made obvious by way of this example, to one of ordinary skill in the art. Moreover, different variations on a user profile incident to utilizing and publishing functions and/or service plans associated with communication devices known in the art are incorporated into the subject disclosure. Further, different logical defaults for determining priority between conflicting originating and receiving user profiles can exist; logical defaults for handling conflicts between device preferences known in the art are further incorporated herein.

If a certain function associated with a device is not available for a particular communication, a media recording component, e.g. 330 and 335, can query a device user to determine whether the user desires media to be recorded and saved. Media recording components 330 and 335 can record and save media for transmission at a later communication, or at a later time in the current communication when the media function is available, or for transmission by an alternate transmission system (e.g. e-mail). Media that can be recorded and saved can include any suitable form of media that can be transmitted through a simultaneous voice and data communication (e.g. video, concurrent audio sounds and/or files, text messages, e-mail messages, IM messages, user application such as a shared game etc.). In the previous example illustrating communication between device A and device B, the user profile associated with device A indicates that streaming video is a desired media function for device B. Because streaming video is not available for the communication with device, media recording component 330 can query device A to determine whether video media should be recorded and saved for later transmission. If a device user responds to a query in the affirmative, then video media captured by the device can be recorded and saved by media recording component 330 for transmission at a later time or by an alternate transmission system.

Figure 4:
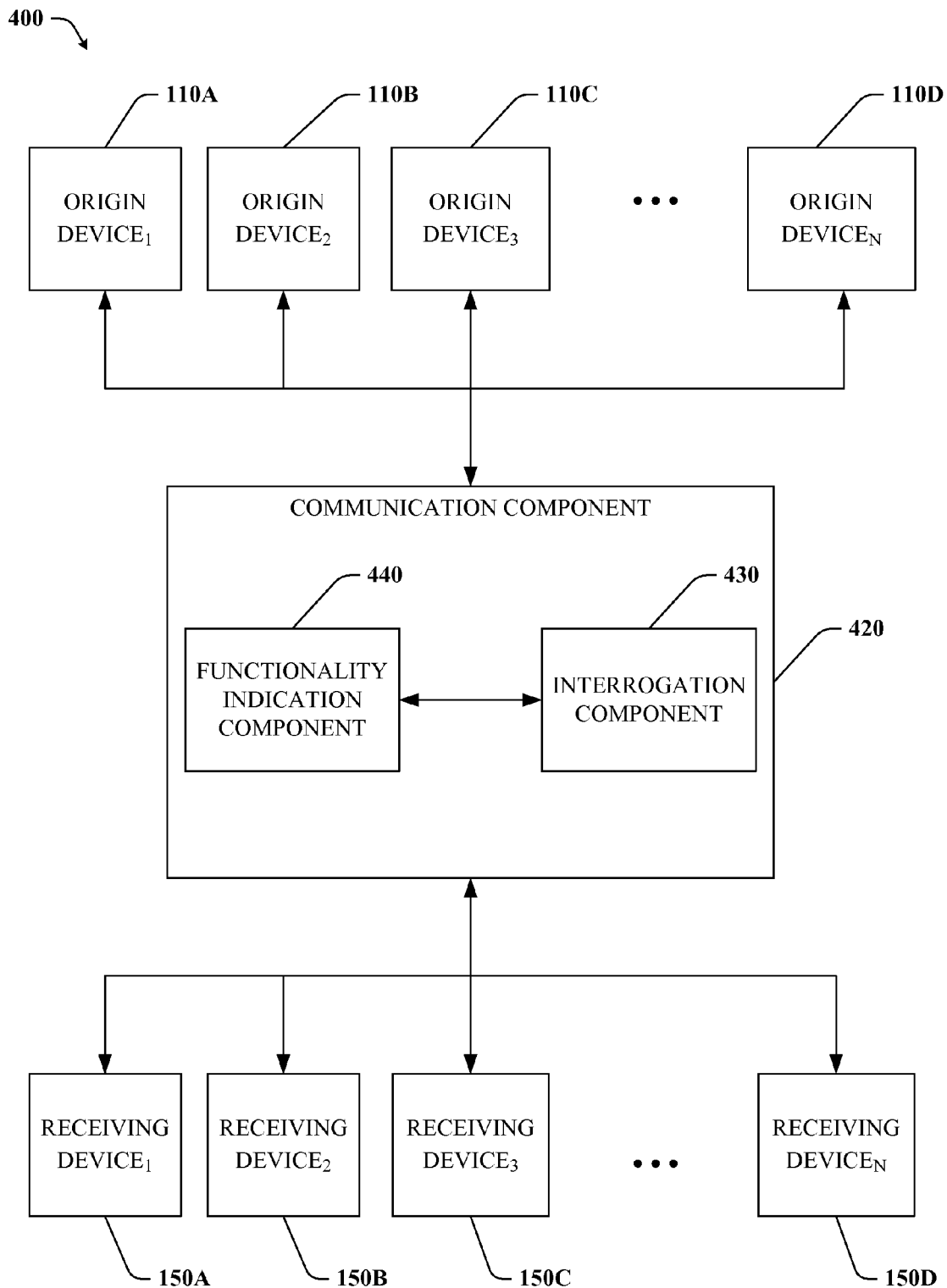
FIG. 4 is a communication component that can monitor presence information and/or user profiles of devices connected to a communication and/or signaling network and in addition can determine capabilities of intervening communication networks.

Referring to FIG. 4, a system 400 is illustrated that can determine and provide functionalities of one or more devices engaged in data exchange (e.g. a conference call, or end-to-end phone call). Communication component 420 is a component or components of one or more communication devices and/or one or more communication networks that can facilitate communication between two or more communication devices, as described supra. Dedicated communication channels between one or more origin (or originating) devices$_{1-N}$ 110A, 110B, 110C and 110D (where N is an integer) and one or more receiving devices$_{1-N}$ 150A, 150B, 150C and 150D are provided by communication component 420. Furthermore, communication component 420 comprises or can function in conjunction with a signaling and/or setup network that can gather information (e.g., location information, routing information, service plan and associated functionality information, etc.) pertaining to devices registered onto such network. Information gathered by a signaling or setup network is often characterized as presence information, and can be obtained prior to or concurrent with establishing a channel for communication between communication devices.

Interrogation component 430 can query originating and receiving communication devices connected to communication component 420, e.g. through a signaling and/or setup network, to determine functionalities and service plans associated with devices. Functionalities and service plans associated with devices include those described in the subject disclosure supra and furthermore those that are known in the art of wired and/or wireless electronic communication. Interrogation component 430 can further query a network that a communication device is connected to, or networks and/or communication components involved in forming a connection between two or more devices, to determine voice and/or data transfer capabilities of those networks and components, communication service plans associated with a network, and communication service plans associated with devices connected by way of a network. It should be appreciated that interrogation component 430 can be a component of a communication network and/or of a communication device.

Functionality indication component 440 can be a component of a communication network and/or a communication device, and can selectively screen and reveal functionalities of communication devices so as to indicate to a communication device user what functionality is common between two or more devices. Functionality indication component 440 can further selectively screen and reveal functionalities supported by communication networks and/or components involved in connecting two or more communication devices so as to indicate to a communication device user what functionality is supported for a particular communication. Interrogation component 430 can send results of a device and network audit to functionality indication component 440 specifying the functions that devices, components and networks participating in a communication can support. Functionality indication component 440 can further parse those results to determine what functions are common to all networks, devices, and components, and alert communication devices to the presence of available functions and/or service plans through a signaling and/or setup network.

Receiving devices$_{1-N}$ 150A, 150B, 150C and 150D and originating devices$_{1-N}$ 110A, 110B, 110C and 110D are connected to communication component 420 and can be any suitable electronic communication device that can transmit and receive voice, data and/or simultaneous voice and data information by way of a communication network including, for example, a cellular telephone, computer, PDA, landline telephone, satellite telephone, and/or similar device. All originating and receiving devices are connected by a signaling and/or setup network that can optionally be a subset of communication component 420, allowing interrogation component 430 to obtain feature information associated with each device. This feature information can be obtained prior to or contemporaneous with an establishment of a dedicated communication channel between one or more originating devices and one or more receiving devices. Communication component 420 therefore can establish dedicated communication channels between one or more originating and receiving devices, and can further establish or query a signaling and/or setup network to obtain functionality and service plan information for each dedicated channel. By doing so, communication component 420 can notify originating and receiving devices 110A, 110B, 110C and 110D and 150A, 150B, 150C and 150D respectively of functions and service plans available for each dedicated communication in accordance with the subject disclosure.

In an alternative aspect of the subject disclosure, system 400 can add and/or remove devices from an existing communication channel. Communication component 420 can remove devices from an existing communication (e.g. on request of a 3-way calling or conference call initiator) or add additional devices thereto. Upon adding a device, interrogation component 430 can query the newly added device, determine feature information associated therewith, and update other communication participants of features common to all connected participants. As an example to provide context for the disclosure, and not to limit the disclosure, devices X, Y, and Z are mobile communication devices (e.g. similar to those described herein). Device X and Y are connected via communication component 420 and can utilize a streaming video function. If device Z is subsequently connected, interrogation component can determine features available for device Z, and functionality indication component 440 can update (e.g. play an audio announcement, update a user interface display, and the like) devices X, Y and Z as to features common to all devices. If device Z does not support a streaming video function, functionality indication component 440 can indicate that device Z is unable to participate in streaming video via methods described herein. Otherwise, communication component 420 can connect device Z in such a manner as to allow for streaming video data transfer between the three devices.

In addition, system 400 can update common features of connected devices if one or more other devices join and/or disconnect from a communication channel. In regard to the previous example with devices X, Y, and Z, assume that devices X and Y support a concurrent audio function, but device Z does not. As long as device Z is connected, functionality indication component 440 will not indicate that all connected devices can utilize concurrent audio services. If, however, device Z disconnects from the communication channel, interrogation component 430 can re-audit all connected devices, devices X and Y in this example, and functionality indication component 440 can then indicate that concurrent audio is available for all connected devices. Alternatively, functionality indication component 440 can store features associated with connected devices and networks. Further, such stored features can be referenced if participation in a communication changes (e.g., if one or more devices connect or disconnect from the communication). Consequently, in the context of the previous example, if device Z disconnects from the communication channel (or, for instance, another device, device W joins the communication channel) functionality indication component 440 can update common features of device X and Y without a re-audit occurring (or, for instance, device W can be audited and its features identified and compared to features of devices X, Y, and Z stored by functionality indication component 440).

Figure 5:
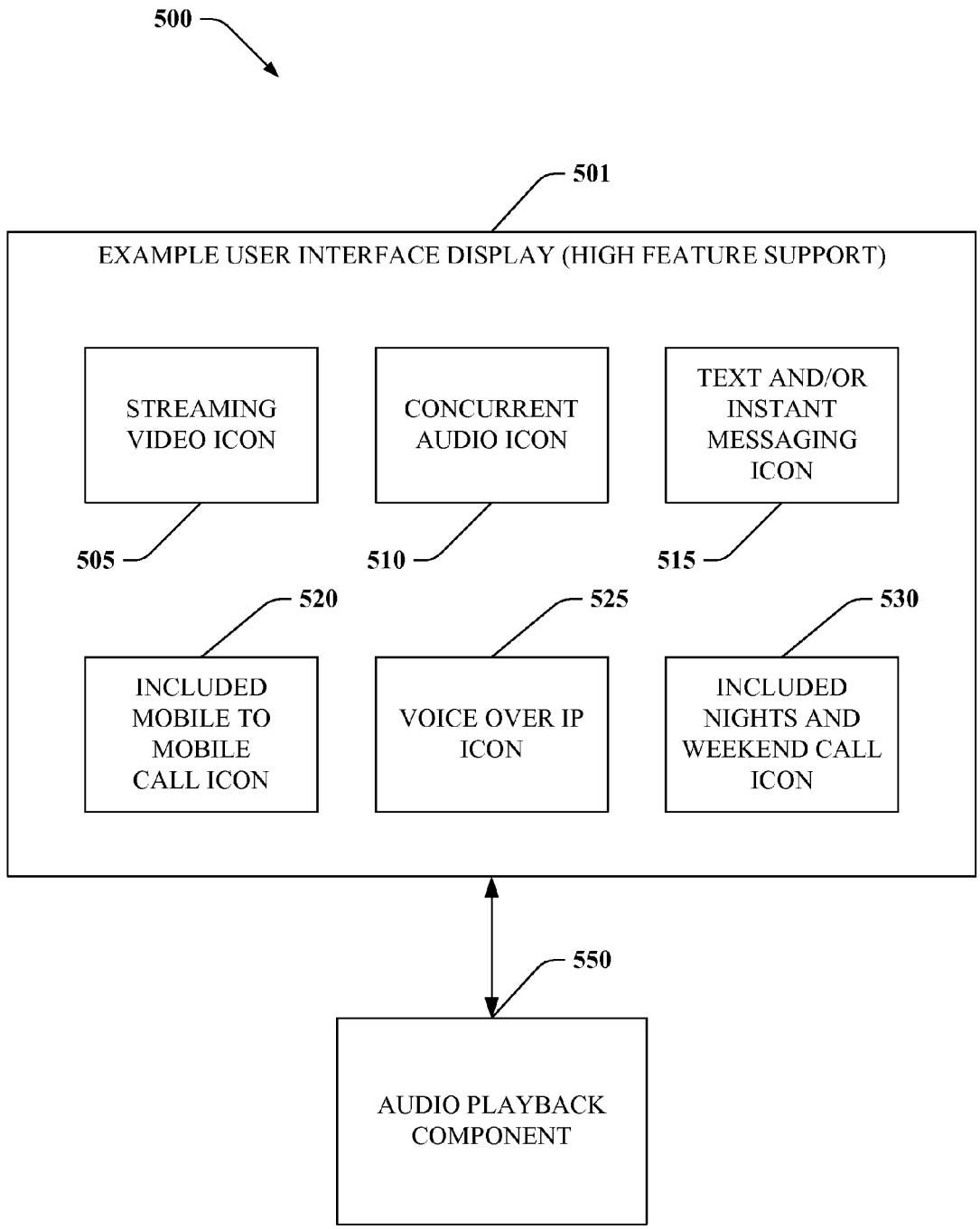
FIG. 5 is a block diagram of a sample user interface display of a communication device indicating features available for a communication.

Referring now to FIG. 5, an exemplary block diagram of a user interface 500 is depicted that indicates available functions for two devices. This illustration is only a single embodiment of a user interface indicating functionality and should not be construed so as to limit the breadth of the disclosure as understood by one of ordinary skill in the art. A user interface display 501 of a communication device can indicate various features (e.g. device functions and subscription plan features) commonly associated with communication devices. In particular, user interface display 501 illustrates features associated with two or more communication devices and at least one network connecting them (e.g. an end-to-end mobile communication) that have simultaneous voice and data transfer capability. User interface display 501 can display graphical icons that represent device features that are fully supported for an end-to-end mobile communication. Functions supported by, for example, one communication device but not another can be indicated in some graphically distinct manner, e.g. a grayed-out or dashed icon or simply not displayed. As illustrated in FIG. 5, streaming video, concurrent audio, text and/or instant messaging, mobile to mobile calling, voice over IP, and included nights and weekends icons 505, 510, 515, 520, 525, and 530 respectively, indicate features available for a particular communication.

User interface 500 can further include an audio playback component 550 that can play an audio ring tone or other audio sound, file, and/or message indicating that a particular function or set of functions is available for a particular communication. Audio playback component 550 can be utilized in conjunction with or in lieu of user interface display 501 to indicate available device features.

Figure 6:
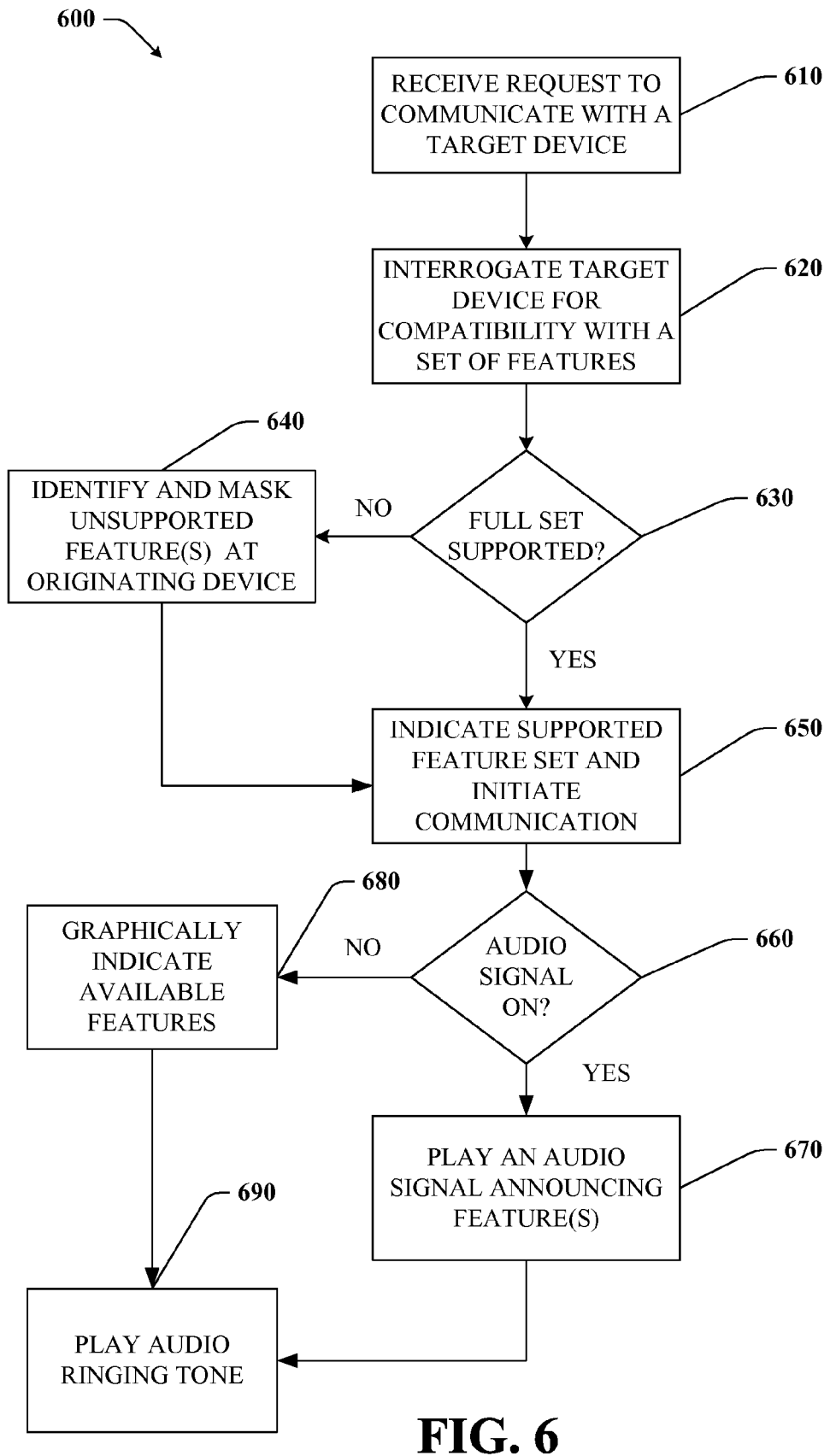
FIG. 6 is a high-level flowchart illustrating an exemplary process of identifying and displaying functionality common to connected devices.

Referring now to FIG. 6, a methodology 600 is illustrated in accordance with an aspect of the subject innovation. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. In addition, it should be appreciated that methodology 600, and all other methodologies disclosed in the subject application, is but one example methodology intended to provide a context for various aspects of the disclosure. Consequently, it should not be construed to limit the disclosure to the acts depicted therein.

More specifically, methodology 600 depicts a method for indicating the availability of all or a subset of all features (e.g. device functions, service subscription plan features, and the like) common to network-connected originating and target communication devices. At 610, a request is received to establish communication with a target device. The request can be made by any suitable communication device disclosed herein or substantially similar device known in the art, and received by a communication component capable of establishing a communication channel between two or more communication devices. At 620, a target device is interrogated to determine compatibility of the target device with a set of features. The set of features can be features associated with an originating device, the target device, features included in a default feature set, or combinations thereof.

At 630, a determination is made as to whether the target device supports all features contained within the set of features. If not, methodology 600 proceeds to 640 where unsupported functions are identified and masked, or otherwise not revealed, at an originating device, and thereafter methodology 600 proceeds to 650. At 650, features supported by the target device are indicated as available at an originating and/or target device(s), and communication is initiated. At 660 a determination is made as to whether an audio announcement service feature, which can announce (e.g. via a speaker or the like) an availability of one or more of a set of features, is available and activated. If such announcement service feature is available and activated, an audio signal can be played at 670 at an originating and/or target device(s) announcing the supported feature set. Otherwise, methodology 600 proceeds to 680 where available features can be indicated graphically, instead. From 670 and 680, methodology 600 can proceed to 690, where a typical ringing tone can be played at the originating device to indicate that the network is still attempting to connect the target device.

Figure 7:
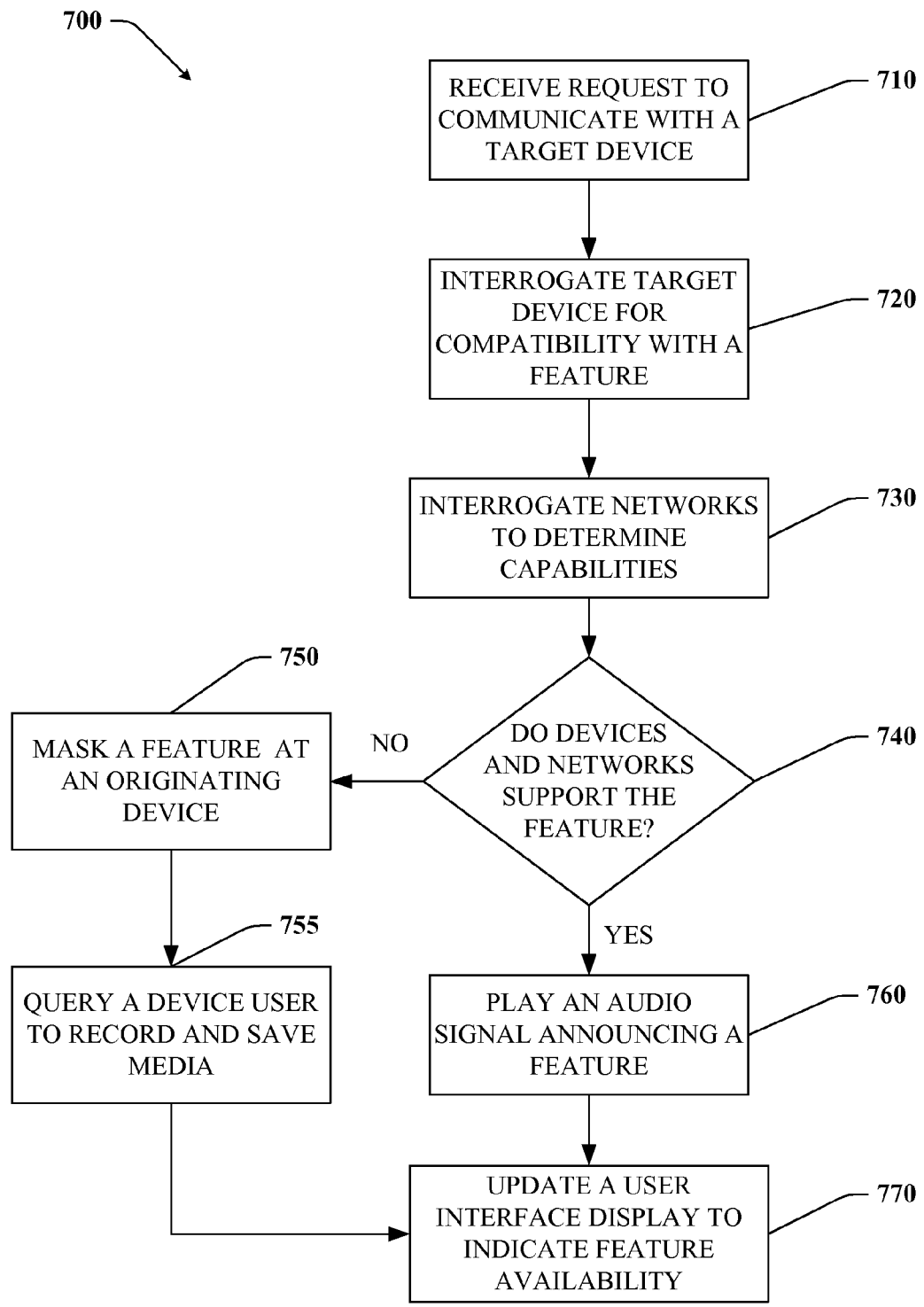
FIG. 7 is a sample flowchart that illustrates a methodology for interrogating connected communication devices and networks to determine availability of a communication feature.

Referring now to FIG. 7, a methodology 700 is illustrated for announcing presence information in accordance with various aspects of the subject disclosure. More specifically, communication devices and associated communication networks that form an end-to-end connection between two or more devices are interrogated via a signaling and/or setup network to determine whether a feature (e.g. a device functionality, a subscription plan feature, etc.) is supported by associated devices and networks. Components of connected devices can announce and/or otherwise indicate such determination to alert device-users of availability of a feature.

At 710, a request is received to establish communication with a target device. The request can be made by most any suitable communication device disclosed herein (e.g. a mobile phone), and received by a communication component capable of establishing a dedicated communication channel between two or more communication devices. At 720, a target device is interrogated to determine its compatibility with a feature, as described in the subject specification. At 730, all networks and network components required to establish a dedicated communication between two or more devices are interrogated to determine whether they support the feature. At 740, a determination is made as to whether all associated communication devices and communication networks support the feature. If not, the methodology proceeds to 750 where the feature is masked, or otherwise not revealed, at one or more communication devices (e.g. by indicating the feature is not available, and/or by not indicating it as available).

At 755, a device is queried to determine whether a particular media (e.g. described supra), not supported by a particular communication channel, can be recorded and saved for later transmission. The later transmission can occur when a communication subsequently supports transmission of the media, or can occur by way of an alternate transmission mechanism (e.g., e-mail etc.). The following example is illustrative of a media recording and storing in accord with various aspects of the claimed subject matter. A parent is at a child's soccer match, speaking on a mobile device with a spouse who is at work, or otherwise unable to attend the match. The parent wishes to capture the soccer match as streaming video media, and relay that to the spouse. However, if a communication network that a parent is logged on to does not support streaming video services, such services cannot be utilized. If the spouse has streaming video indicated (e.g., as a preferred device function etc.) on a user profile, or otherwise attempts to access streaming video functionality, the mobile phone can indicate that the streaming video media can be captured and recorded for subsequent transmission (e.g., on a virtual or physical storage device located proximate the mobile phone, the network, or combinations thereof). From 755, methodology 700 proceeds to 770. If at 740 the determination finds that all connected devices and networks support the feature, methodology 700 proceeds to 760 where an audio signal announcing availability of a feature is played on one or more devices. At 770, a user interface display of one or more devices can be updated to further indicate availability of a feature.

Figure 8:
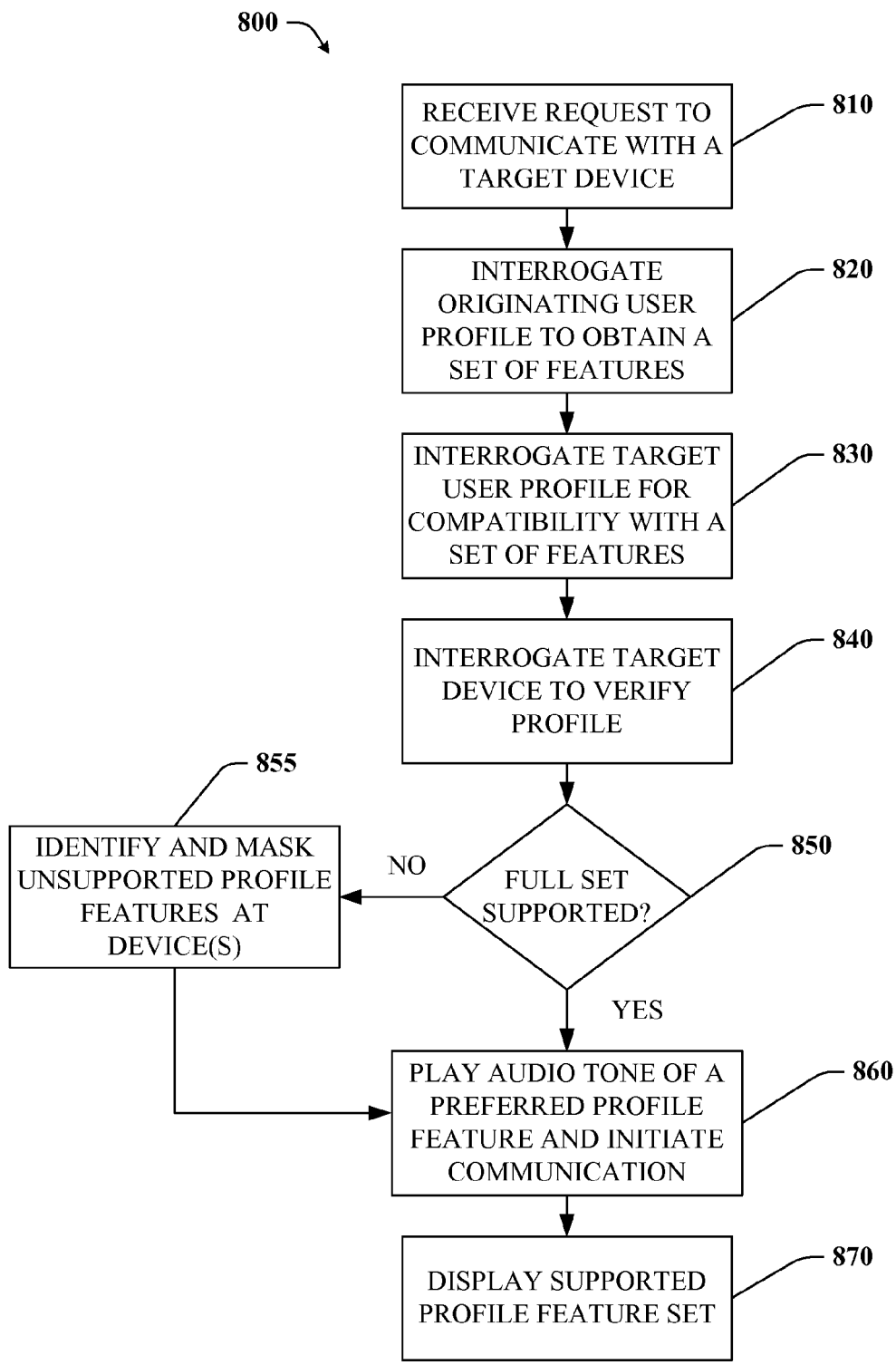
FIG. 8 is a further aspect of the subject disclosure illustrating a process of masking unavailable features and revealing and announcing a set or subset of available features at a communication device in accordance with a user profile.

Referring now to FIG. 8, a methodology 800 is illustrated that discloses a method for indicating features (e.g. device functions, subscription plan features, etc.) available for a communication subject to preferences established by a user profile. At 810, a request is received to establish communication with a target device. The request can be made by a communication device disclosed herein, and received by a communication component capable of establishing a dedicated communication channel between two or more communication devices. At 820, a user profile associated with an originating device is interrogated to obtain a predetermined set of preferred features associated with the originating device. At 830, a user profile associated with a target device is interrogated to determine the target device's compatibility with the set of features. At 840, the target device itself can be interrogated to verify the accuracy of the target device user profile. This verification can ensure the accuracy of a subsequent indication of service availability.

At 850, a determination is made as to whether the full set of features specified by the user profile of the originating device are also supported by the user profile of the target device, and all networks and network components required to connect the devices. If a full set of features is not supported, methodology 800 proceeds to 855 where availability of unsupported features are identified and masked from the communication devices. At 860, an audio signal announcing availability of features specifically flagged by a user profile for audio verification is played on a communication device. At 870, all mutually supported features can be displayed on a user interface display associated with a communication device to graphically indicate available features.

Figure 9:
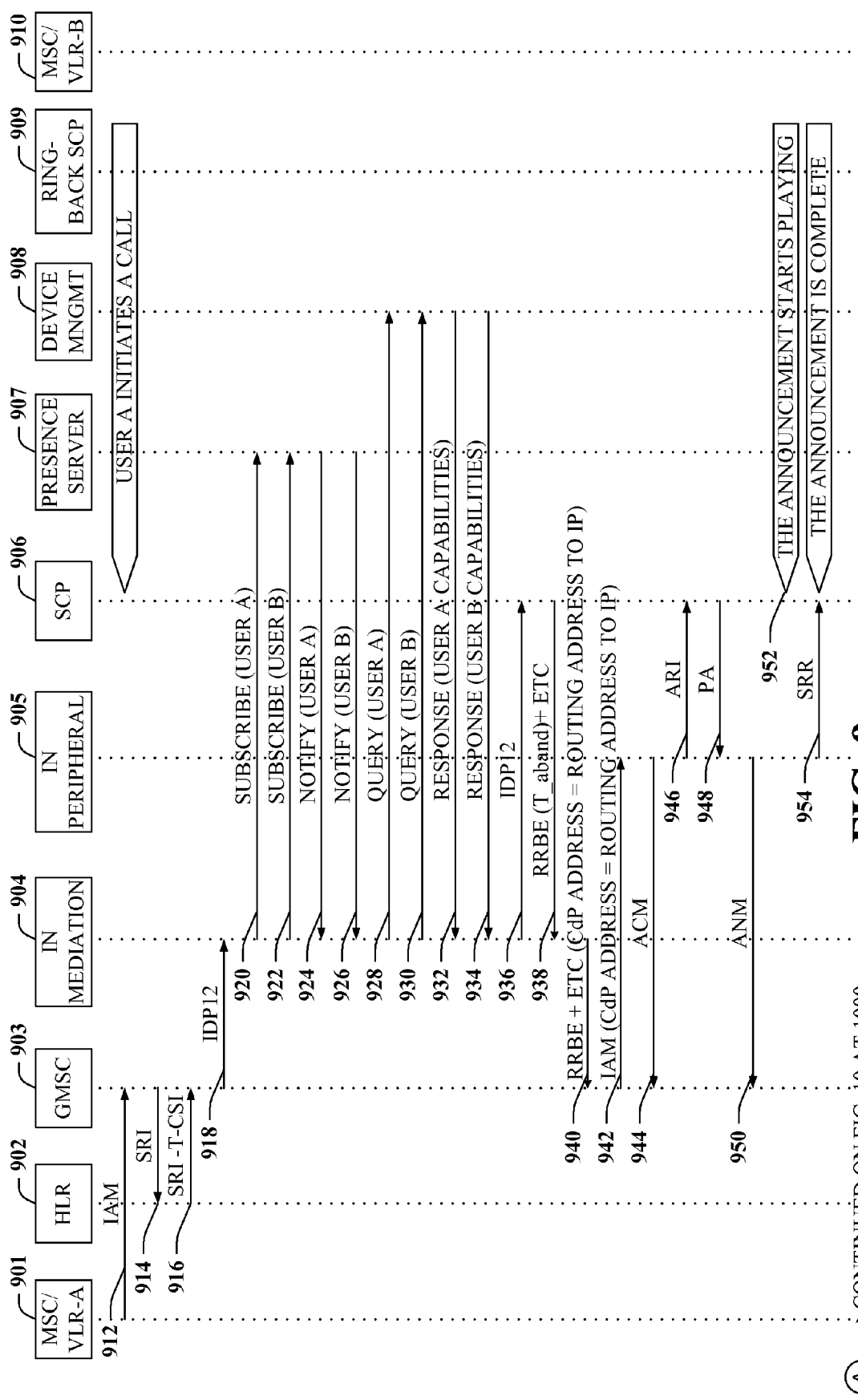
FIG. 9 is an exemplary flowchart describing an interaction between components of an exemplary network to determine and announce an availability of media service functions and/or subscription plan features in accordance with an aspect of this disclosure.
Figure 10:
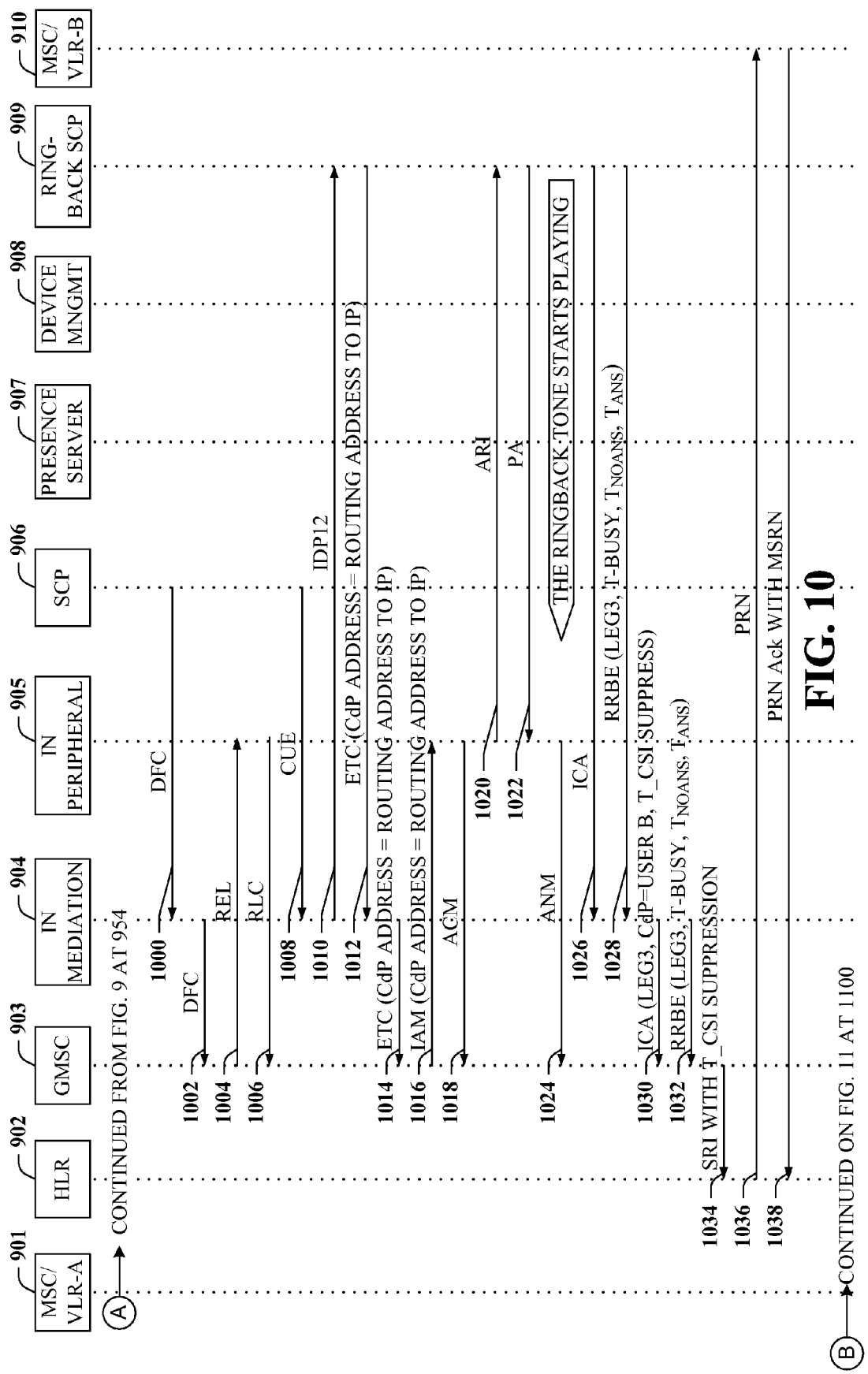
FIG. 10 is a continuation of the exemplary flowchart illustrated in FIG. 10.
Figure 11:
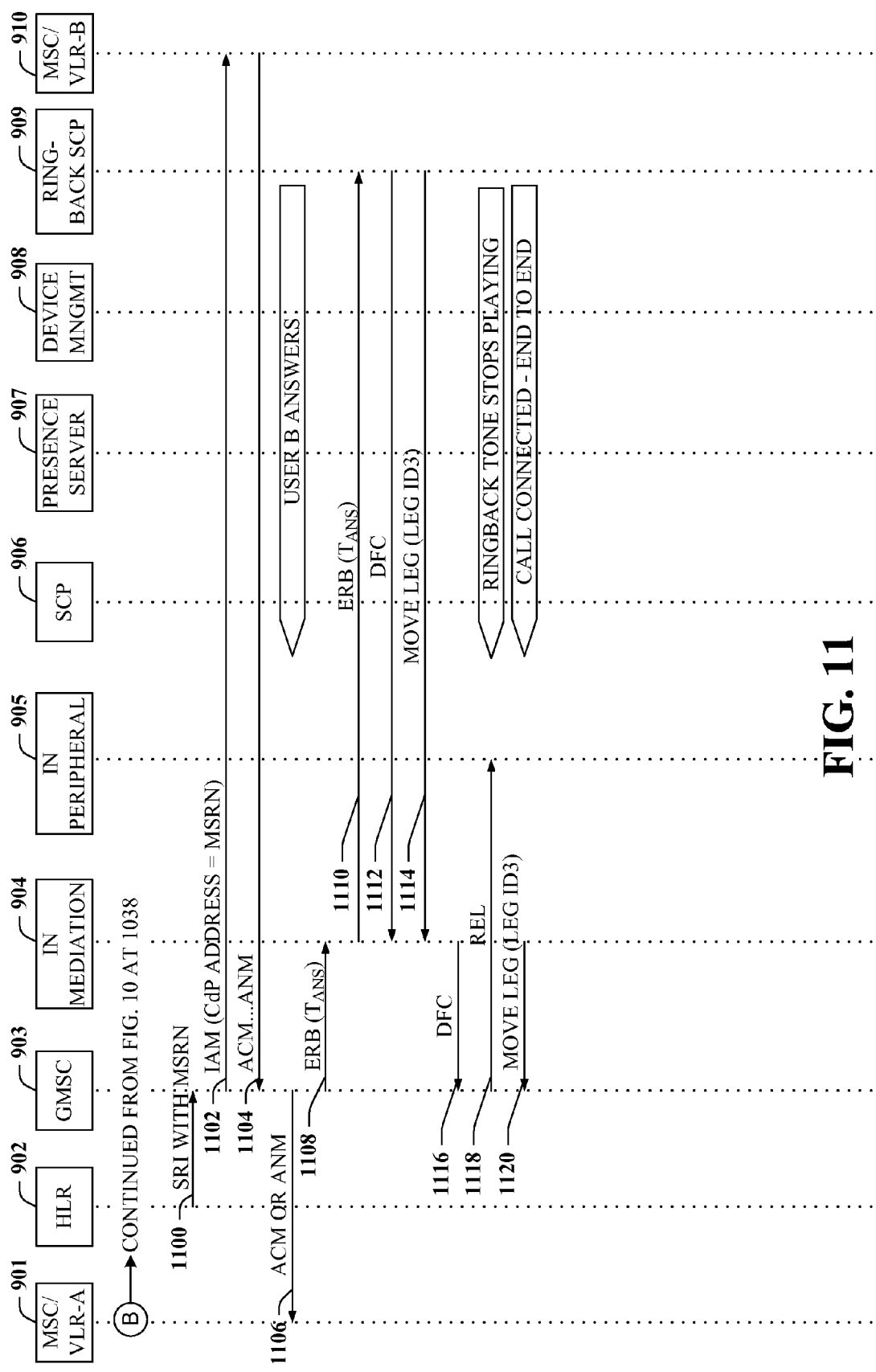
FIG. 11 is a further continuation of the exemplary flowchart illustrated in FIGS. 10 and 11.

Referring now to FIGS. 9, 10 and 11, an exemplary methodology is displayed for connecting two cellular telephones, determining device features (e.g. device functionality and/or subscription plan features) available to each, and playing an audio signal during a call setup period to indicate commonly supported features. The audio signal can optionally be played in conjunction with other services, such as a ringback tone, to indicate commonly supported features in accordance with the subject disclosure. Several mobile communication network components are depicted and involved in this methodology. In particular, MSC/VLR-A 901 is a mobile switching center (MSC) and visitor location register (VLR) associated with an originating cellular telephone device, device A. A VLR is a temporary database of subscribers who have roamed into a particular area that a MSC/VLR serves.

An MSC is a communication exchange that provides circuit switched calling and other services to mobile devices presently within an area that it services. The MSC relies upon a VLR to obtain information about each cellular subscriber and/or telephone, primarily a home location register (HLR)

associated with a phone and information stored in a HLR (e.g., a phone identity number, authentication information, phone number, and services associated with a subscriber's phone and account). HLR 902 is a home location register associated with a mobile phone service provider. More specifically, HLR 902 is a database or group of databases that store information pertaining to each mobile phone associated with a mobile phone service provider. When a mobile phone roams into an area covered by a MSC, a VLR associated with that MSC queries the mobile phone to identify an HLR associated with the mobile phone. Once identified, the VLR then queries such HLR to determine details about the mobile phone necessary for routing calls to it, providing applicable voice, text, and data services, and recording appropriate billing information for those services.

GMSC 903 is a gateway mobile switching center that can route calls from and/or between various MSCs within a network, and also amongst routing components of different networks and different network architectures. Although an MSC typically will serve as a home center for a mobile device or group of mobile devices (e.g., containing subscription, charging, routing, and location information, and the like, associated with such device(s)), a GMSC can also retain such information related to a device or group of devices (e.g. if a device roams onto a network of a different architectures, such as a GSM/GPRS device that roams onto an IMS-based IP network, a GMSC can serve as a pseudo 'home' switching center to facilitate provision of subscription, charging, routing, location, etc. information associated with such device(s)).

Intelligent network (IN) mediation 904 can reference other network resources and identify features available to a mobile device or group of devices and further blend various different features together during a single call. IN peripheral 905 can determine routing information associated with mobile phones in order to route data to and from such mobile phones, thereby assisting in establishing a communication channel between mobile devices. SCP 906 is a component of a communication network that can play and/or send an announcement service to a mobile phone, announcing available features (e.g. device functionality and/or subscription plan features associated with a device). Presence server 907 can detect whether a phone is logged onto a network, including, for instance, whether power to the phone is turned on. If a device is logged onto a network, presence server 907 can also determine the type of such network. Communication networks of various architectures (e.g., a second generation [2G] voice-only network, a voice network overlaid with data network services [2.5G], or a simultaneous voice and data communication network [3G]) can support varying levels of device functionality, and consequently can be important to distinguish between in the context of the subject disclosure. Device management 908 is a network database that contains and can provide information about specific functionalities of individual devices logged onto a network. Ringback SCP 909 can play and/or send a ringback tone to a device or devices during a ring-back cycle of call setup and initiation. MSC/VLR-B 910 is an MSC and VLR associated with a receiving mobile telephone, device B. It provides a function for device B analogous to the function provided by MSC/VLR-A 901 to device A (note that MSC/VLR-B 910 and MSC/VLR-A 901 could be the same device or set of devices in accord with aspects of the subject disclosure).

The subject methodology is applicable to call initiation setup procedures that utilize an announcement component (e.g. speaker) to identify available communication features (e.g. via an audio signal or audio file played at the announcement component of a communication device). The methodology can also be utilized in conjunction with other services established during a call initiation period, including a ringback service as illustrated in FIGS. 10 and 11, for instance. At 912, MSC/VLR-A 901 can receive a request to initiate communication from device A (not shown) including a phone number for a target device B (not shown), and forward an initial address message (IAM) related to the request to GMSC 903. At 914, GMSC 903 can send a request to HLR 902 to determine network, routing and service information relating to device B. At 916, HLR 902 responds to the request and notifies GMSC 903 that device A has a presence availability announcement service associated with its subscription, and that MSC/VLR-A 901 can provide this service. At 918, GMSC 903 sends an initial detection point (IDP) message to IN mediation 904 to determine availability of this service and manage performance of the service.

At 920 and 922, IN mediation 904 queries presence server 907 to determine whether device A and device B respectively are logged onto a communication network. At 924 and 926, the presence server 907 responds with presence availability information for device A and device B respectively. For the purposes of this methodology, it is assumed that both device A and device B are logged onto an available communication network. At 928 and 930, IN mediation 904 queries device management 908 to determine capabilities of the communication network(s) that device A and device B are logged onto including, e.g. voice-only capable, voice or data information capable, and simultaneous voice and data information capable, etc. At 932 and 934, device management 908 responds to the query with information about the capabilities of the communication networks that device A and device B are logged onto.

From the response provided by device management 908 at 934, IN mediation 904 has all information necessary to determine whether an announcement service should be played for device A (e.g., because both device A and device B as well as the communication networks they are logged into support video sharing, according to device A's service information). Assuming for this methodology that both devices and associated networks support some common feature for which an announcement service exists, at 936 IN mediation 904 sends a request to SCP 906 to play one or more announcements to device A, indicating available features, e.g., video sharing. At 938, SCP 906 responds to IN mediation 904 with such announcement, and at 940 the announcement is forwarded from IN mediation 904 to GMSC 903 to be played at device A. At 942 through 950, IN peripheral 905 coordinates necessary components to expedite the announcement service including the SCP 906 and GMSC 903. At 952, an audio announcement begins playing on device A indicating an availability of features for the communication with device B. At 954, the announcement is completed and IN peripheral 905 requests SCP 906 to stop playing the announcement. The subject methodology proceeds from FIG. 9 at 954 to FIG. 10 at 1000, where at 1000, 1002, 1004 and 1006 (FIG. 11) necessary communication between SCP 906, IN peripheral 905, IN mediation 904, and GMSC 903 is conducted to stop playing of the announcement (begun at 936) at device A. At 1008, SCP 906 notifies IN mediation 904 that the announcement has stopped and that call initiation may resume.

If device B subscribes to a ringback service that plays an audio signal, music for instance, other than a ringing tone during the ringing period of call initiation, the methodology continues at 1010 through 1032. If device B does not subscribe to a ringback service, then the methodology proceeds from 1008 directly to 1034 and continues from 1034. If device B subscribes to a ringback service, at 1010 an IDP message is sent to ringback SCP 909 to request the ringback tone to begin playing on device A. At 1012 through 1024, the necessary communication between ringback SCP 909, IN mediation 904, IN peripheral 905 and GMSC 903 takes place to expedite playing a ringback tone at device A, and at 1024 the ringback tone begins to play at device A. At 1026 through 1032, initiate call attempt (ICA) routines and request report basic call state model event (RRBE) routines are passed from ringback SCP 909 to IN mediation 904, and from there to GMSC 903 for busy signal, answer, and no answer protocols.

At 1034 through 1038, and from 1100 through 1104 on FIG. 11, call initiation and setup continues for both ringback tone and non-ringback tone cases. At 1034, GMSC 903 sends routing information to HLR 902, and at 1036 HLR 902 forwards routing information and a roaming number of device A to MSC/VLR-B 910. At 1038, MSC/VLR-B 910 responds to HLR 902 with a routing number for device B, and then continuing at FIG. 11, at 1100 HLR 902 forwards that routing number to GMSC 903. At 1102 through 1106, direct communication between MSC/VLR-A 901 and MSC/VLR-B 910 begins, and it is assumed that device B answers the telephone call at 1106. At 1108 through 1116, signaling between GMSC 903, IN mediation 904 and ringback SCP 909 commences to terminate the ringback tone. At 1118, the ringback tone stops playing at device A, and at 1120 the call is connected end to end from device A to device B, for either example case, with or without ringback tone service. It should be appreciated that the announcement service described herein can be utilized alone or in conjunction with other services during, just prior to, or subsequent callback initiation and setup, and that other methodologies and network components involved in such methodologies, known in the art, are included in this disclosure.

It should be appreciated, that FIGS. 9-11 depict one example methodology only, and that similar embodiments known to one of skill in the art are contemplated as part of the disclosed subject matter. Specifically, network announcements (e.g., indicated by an audio signal played at a mobile device) can be provided by a circuit-switched network architecture, packet-switched network architecture, or a circuit-switched network overlaid with a packet switched infrastructure (e.g., IP multimedia subsystem (IMS) or similar infrastructure), or combinations thereof. Additionally, similar communication networks, such as WiFi, WiMAX, and like voice or voice and data capable communication networks can be included herein. Additionally, instruction and setup protocols that identify device features, as described supra, and provide indications thereof can include typical circuit switched protocols (e.g., Customized Applications for Mobile networks Enhanced Logic (CAMEL) protocols or the like), packet switched protocols (e.g., session initiation protocol (SIP) protocols or the like), and combinations of these and/or like protocols. Moreover, a device capable of receiving the network announcement(s) can include a circuit-switched, packet-switched, combination circuit and packet switched device, as well as other mobile devices capable of communication via networks disclosed herein. As such, the subject specification should not be limited by the specific example embodiments depicted in the figures and discussed within the written descriptions thereof.

Figure 12:
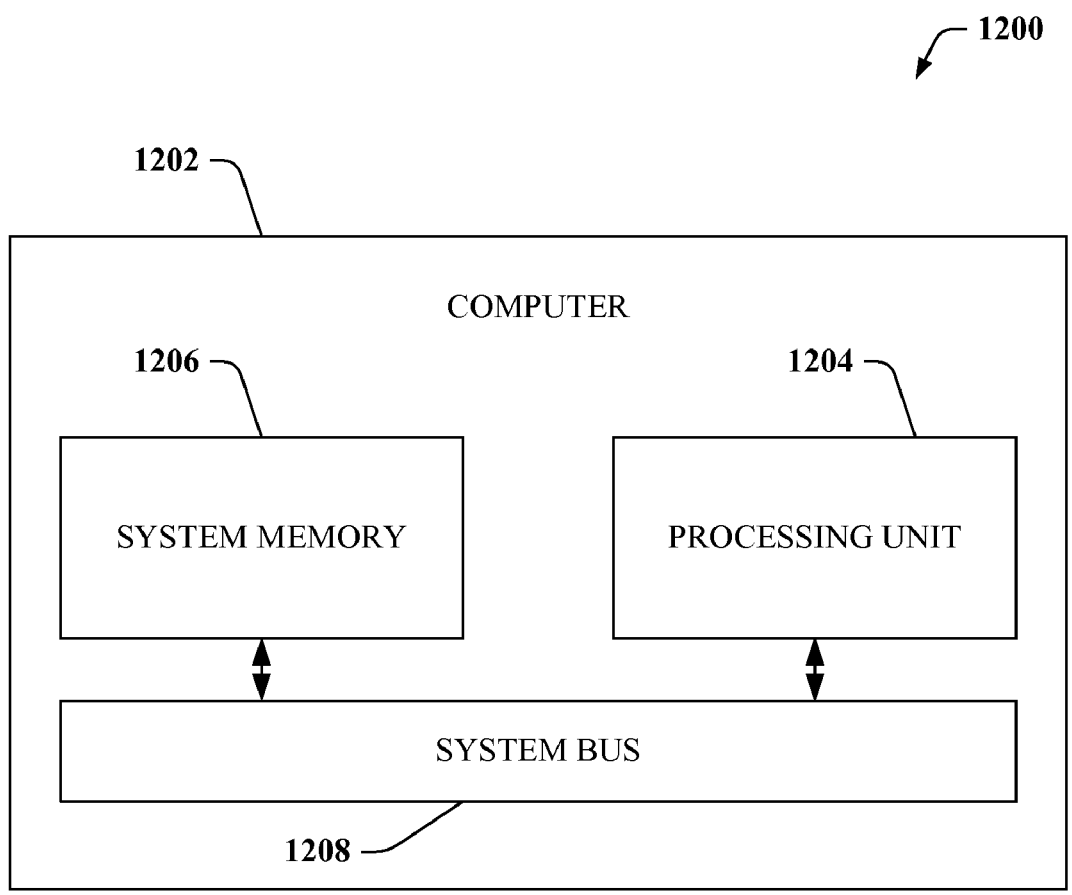
FIG. 12 illustrates an example computing environment that can be employed in connection with various aspects described herein.

Referring now to FIG. 12, there is illustrated a block diagram of a computer operable to provide networking and communication capabilities between a wired or wireless communication network and a server and/or communication device. While shown through use of a computer or computing components, it is understood that the claimed subject matter may be implemented as a method, apparatus, or article of manufacture using standard programming and/or engineering techniques to produce software, firmware, hardware, or any suitable combination thereof to control a computing device, such as a mobile handset, to implement the disclosed subject matter. The term "article of manufacture" as used herein is intended to encompass a computer program accessible from any suitable computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, SIM cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In order to provide additional context for various aspects of the claimed subject matter, FIG. 12 and the following discussion are intended to provide a brief, general description of a suitable computing environment 1200 in which the various aspects described herein can be implemented. While the description above is in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any suitable media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any suitable method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other suitable medium which can be used to store the desired information and which can be accessed by the computer.

Communication media typically embodies computer-readable instructions, data structures, program modules or other data in a modulated data signal such as a carrier wave or other transport mechanism, and includes any suitable information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the above should also be included within the scope of computer-readable media.

With reference again to FIG. 12, the exemplary environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various suitable commercially available processors, such a single core processor, a multi-core processor, or any other suitable arrangement of processors.

The system bus 1208 can be any of several suitable types of bus structure that may further interconnect to a memory bus (with or without a memory controller), a peripheral bus, and a local bus using any of a variety of commercially available bus architectures. The system memory 1206 can include read-only memory (ROM), random access memory (RAM), high-speed RAM (such as static RAM), EPROM, EEPROM, and/or the like. Additionally or alternatively, the computer 1202 can include a hard disk drive, upon which program instructions, data, and the like can be retained. Moreover, removable data storage can be associated with the computer 1202. Hard disk drives, removable media, etc. can be communicatively coupled to the processing unit 1204 by way of the system bus 1208.

The system memory 1206 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1202 through one or more wired/wireless input devices, such as a keyboard, pointing and clicking mechanism, pressure sensitive screen, microphone, joystick, stylus pen, etc. A monitor or other type of interface can also be connected to the system bus 1208.

The computer 1202 may operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1202 can connect to other devices/networks by way of antenna, port, network interface adaptor, wireless access point, modem, and/or the like.

The computer 1202 is operable to communicate with any suitable wireless devices or entities operatively disposed in wireless communication, e.g., a printer, scanner, desktop and/or portable computer, portable data assistant, communications satellite, any suitable piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11(a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
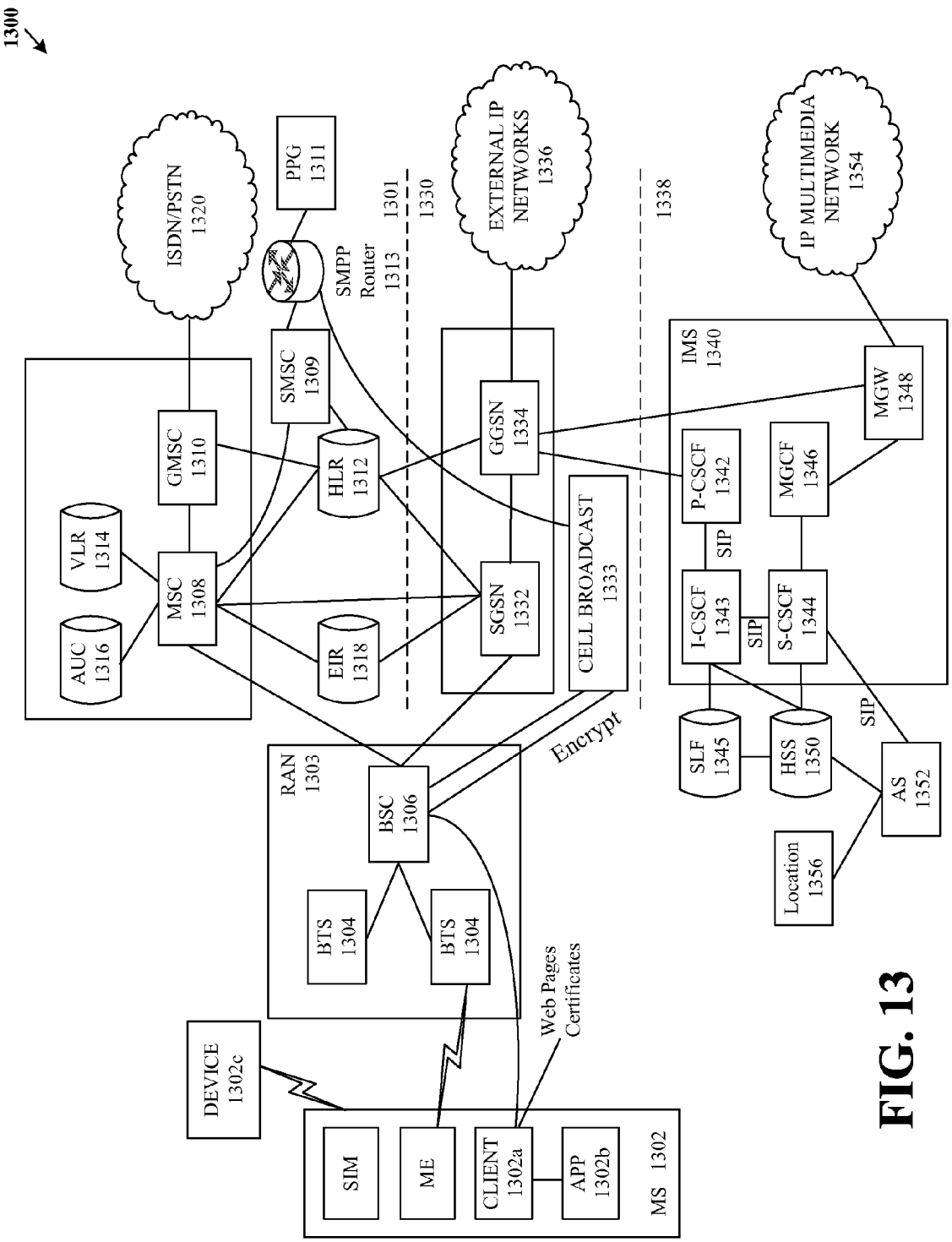
FIG. 13 is an example networking environment.

Now turning to FIG. 13, such figure depicts a GSM/GPRS/IP multimedia network architecture 1300 that includes a GSM core network 1301, a GPRS network 1330 and an IP multimedia network 1338. The GSM core network 1301 includes a Mobile Station (MS) 1302, at least one Base Transceiver Station (BTS) 1304 and a Base Station Controller (BSC) 1306. The MS 1302 is physical equipment or Mobile Equipment (ME), such as a mobile phone or a laptop computer that is used by mobile subscribers, for example, in conjunction with a Subscriber identity Module (SIM), or like identification indicator. The SIM includes an International Mobile Subscriber Identity (IMSI), which is a unique identifier of a subscriber. The MS 1302 includes an embedded client 1302a that receives and processes messages received by the MS 1302. The embedded client 1302a may be implemented in JAVA and is discuss more fully below.

The embedded client 1302a communicates with an application 1302b that provides services and/or information to an end user. One example of the application may be navigation software that provides near real-time traffic information that is received via the embedded client 1302a to the end user. The navigation software may provide road conditions, suggest alternate routes, etc. based on the location of the MS 1302. Those of ordinary skill in the art understand that there are many different methods and systems of locating an MS 1302.

Alternatively, the MS 1302 and a device 1302c may be enabled to communicate via a short-range wireless communication link, such as BLUETOOTH. For example, a BLUETOOTH SIM Access Profile may be provided in an automobile (e.g., device 1302c) that communicates with the SIM in the MS 1302 to enable the automobile's communications system to pull information from the MS 1302. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1302c. There may be an endless number of devices 1302c that use the SIM within the MS 1302 to provide services, information, data, audio, video, etc. to end users.

The BTS 1304 is physical equipment, such as a radio tower, that enables a radio interface to communicate with the MS. Each BTS may serve more than one MS. The BSC 1306 manages radio resources, including the BTS. The BSC may be connected to several BTSs. The BSC and BTS components, in combination, are generally referred to as a base station (BSS) or radio access network (RAN) 1303.

The GSM core network 1301 also includes a Mobile Switching Center (MSC) 1308, a Gateway Mobile Switching Center (GMSC) 1310, a Home Location Register (HLR) 1312, Visitor Location Register (VLR) 1314, an Authentication Center (AuC) 1318, and an Equipment Identity Register (EIR) 1316. The MSC 1308 performs a switching function for the network. The MSC also performs other functions, such as registration, authentication, location updating, handovers, and call routing. The GMSC 1310 provides a gateway between the GSM network and other networks, such as an Integrated Services Digital Network (ISDN) or Public Switched Telephone Networks (PSTNs) 1320. In other words, the GMSC 1310 provides interworking functionality with external networks.

The HLR 1312 is a database or component(s) that comprises administrative information regarding each subscriber registered in a corresponding GSM network. The HLR 1312 also includes the current location of each MS. The VLR 1314 is a database or component(s) that contains selected administrative information from the HLR 1312. The VLR contains information necessary for call control and provision of subscribed services for each MS currently located in a geographical area controlled by the VLR. The HLR 1312 and the VLR 1314, together with the MSC 1308, provide the call routing and roaming capabilities of GSM. The AuC 1316 provides the parameters needed for authentication and encryption functions. Such parameters allow verification of a subscriber's identity. The EIR 1318 stores security-sensitive information about the mobile equipment.

A Short Message Service Center (SMSC) 1309 allows one-to-one Short Message Service (SMS) messages to be sent to/from the MS 1302. A Push Proxy Gateway (PPG) 1311 is used to "push" (e.g., send without a synchronous request) content to the MS 1302. The PPG 1311 acts as a proxy between wired and wireless networks to facilitate pushing of data to the MS 1302. A Short Message Peer to Peer (SMPP) protocol router 1313 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1302 sends a location update including its current location information to the MSC/VLR, via the BTS 1304 and the BSC 1306. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1330 is logically implemented on the GSM core network architecture by introducing two packet-switching network nodes, a serving GPRS support node (SGSN) 1332, a cell broadcast and a Gateway GPRS support node (GGSN) 1334. The SGSN 1332 is at the same hierarchical level as the MSC 1308 in the GSM network. The SGSN controls the connection between the GPRS network and the MS 1302. The SGSN also keeps track of individual MS's locations and security functions and access controls.

A Cell Broadcast Center (CBC) 1333 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1334 provides a gateway between the GPRS network and a public packet network (PDN) or other IP networks 1336. That is, the GGSN provides interworking functionality with external networks, and sets up a logical link to the MS through the SGSN. When packet-switched data leaves the GPRS network, it is transferred to an external TCP-IP network 1336, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, arc the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vise versa.

The IP multimedia network 1338 was introduced with 3GPP Release 5, and includes an IP multimedia subsystem (IMS) 1340 to provide rich multimedia services to end users. A representative set of the network entities within the IMS 1340 are a call/session control function (CSCF), a media gateway control function (MGCF) 1346, a media gateway (MGW) 1348, and a master subscriber database, called a home subscriber server (HSS) 1350. The HSS 1350 may be common to the GSM network 1301, the GPRS network 1330 as well as the IP multimedia network 1338.

The IP multimedia system 1340 is built around the call/session control function, of which there are three types: an interrogating CSCF (I-CSCF) 1343, a proxy CSCF (P-CSCF) 1342, and a serving CSCF (S-CSCF) 1344. The P-CSCF 1342 is the MS's first point of contact with the IMS 1340. The P-CSCF 1342 forwards session initiation protocol (SIP) messages received from the MS to an SIP server in a home network (and vice versa) of the MS. The P-CSCF 1342 may also modify an outgoing request according to a set of rules defined by the network operator (for example, address analysis and potential modification).

The I-CSCF 1343 forms an entrance to a home network, hides the inner topology of the home network from other networks and provides flexibility for selecting an S-CSCF. The I-CSCF 1343 may contact a subscriber location function (SLF) 1345 to determine which HSS 1350 to use for the particular subscriber, if multiple HSS's 1350 are present. The S-CSCF 1344 performs the session control services for the MS 1302. This includes routing originating sessions to external networks and routing terminating sessions to visited networks. The S-CSCF 1344 also decides whether an application server (AS) 1352 is required to receive information on an incoming SIP session request to ensure appropriate service handling. This decision is based on information received from the HSS 1350 (or other sources, such as an application server 1352). The AS 1352 also communicates to a location server 1356 (e.g., a Gateway Mobile Location Center (GMLC)) that provides a position (e.g., latitude/longitude coordinates) of the MS 1302.

The HSS 1350 contains a subscriber profile and keeps track of which core network node is currently handling the subscriber. It also supports subscriber authentication and authorization functions (AAA). In networks with more than one HSS 1350, a subscriber location function provides information on the HSS 1350 that contains the profile of a given subscriber.

The MGCF 1346 provides interworking functionality between SIP session control signaling from the IMS 1340 and ISUP/BICC call control signaling from the external GSTN networks (not shown). It also controls the media gateway (MGW) 1348 that provides user-plane interworking functionality (e.g., converting between AMR- and PCM-coded voice). The MGW 1348 also communicates with other IP multimedia networks 1354.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory to store computer-executable instructions; and
a processor, communicatively coupled to the memory, that facilitates execution of the computer-executable instructions to perform operations comprising:
obtaining first feature information associated with an originating device and a receiving device, in response to the originating device requesting to establish a communication with the receiving device,
receiving presence availability information indicative of respective communication networks, to which the originating device and the receiving device are currently connected,
auditing a network server to determine second feature information indicative of a feature supported by a network component associated with the network server, the originating device, the receiving device and the respective communication networks
parsing a result of the auditing to identify a media function based in part on a first user profile associated with the originating device, a second user profile associated with the receiving device, the first feature information, and the second feature information,
receiving first data indicative of respective communication capabilities of the respective communication networks,
determining a current availability associated with the media function based in part on the first data; and
in response to a determination that the media function is currently unavailable, facilitating transmission of second data associated with the communication to the receiving device via email.

2. The system of claim 1, wherein the first user profile associated with the originating device indicates a preference of the originating device that relates to a first masking of a first portion of the first feature information associated with the originating device, and the second user profile associated with the receiving device indicates a preference of the receiving device that relates to a second masking of a second portion of the first feature information associated with the receiving device.

3. The system of claim 1, wherein the first feature information includes a subscription plan feature supported by the receiving device.

4. The system of claim 1, wherein the first feature information includes a media transfer function associated with the receiving device.

5. The system of claim 1, wherein the operations further comprise: initiating an indication of the media function at the originating device during a ring-back cycle.

6. The system of claim 1, wherein the operations further comprise: receiving input that authorizes the transmission of the second data associated with the communication to the receiving device via email.

7. The system of claim 1, wherein the operations further comprise: facilitating a rendering of an audio signal indicative of the media function at the originating device.

8. The system of claim 1, wherein the operations further comprise: facilitating a presentation of an indication, at the originating device via an audio signal, that the media function is not available.

9. The system of claim 1, wherein the operations further comprise: facilitating a presentation of a graphical icon on the originating device that is indicative of the media function, in response to the media function being currently available.

10. The system of claim 1, wherein the operations further comprise: re-auditing the originating device, the receiving device, and the respective communication networks, with a disparate device to update the second feature information, in response to the disparate device being added to the communication.

11. The system of claim 1, wherein the operations further comprise: storing, within the memory, the second data associated with the communication, in response to the media function being currently unavailable.

12. A non-transitory computer readable storage medium comprising computer-executable instructions that, in response to execution, cause a system comprising a processor to perform operations, comprising:
receiving a request from a first communication device to establish a communication with a second communication device;

identifying a set of communication networks, to which the first communication device and the second communication device are currently connected, based on presence information;

auditing a network server to determine first feature information indicative of a feature supported by a network component associated with the network server, the first communication device, the second communication device and the set of communication networks;

parsing a result of the auditing to identify a media function based in part on a first user profile associated with the first communication device, a second user profile associated with the second communication device, and the feature data;

obtaining second feature information associated with the set of communication networks from a network data store, including receiving transfer data indicative of respective communication capabilities of communication technologies employed by the set of communication networks;

identifying a current availability of the media function based in part on the second feature information; and facilitating a transmission of data associated with the communication to the second communication device via an email messaging protocol, in response to the media function being currently unavailable.

13. A method, comprising:

interrogating, by a system comprising a processor, a first communication device and a second communication device for device-related feature data in response to determining that the first communication device has initiated a communication with the second communication device;

based on presence data, identifying, by the system, a set of communication networks, to which the first communication device and the second communication device are currently connected;

auditing, by the system, a network server to determine feature information indicative of a feature supported by a network component associated with the network server, the first communication device, the second communication device and the set of communication networks;

parsing, by the system, a result of the auditing to identify a media function based in part on a first user profile associated with the first communication device, a second user profile associated with the second communication device, and the device-related feature data;

receiving, by the system, network-related feature data indicative of respective communication capabilities of the set of communication networks;

determining, by the system, a current availability of the media function based in part on the network-related feature data; and facilitating, by the system, transmission of data associated with the communication to the second communication device via an email server, in response to the media function being currently unavailable.

14. The method of claim 13, further comprising:

facilitating, by the system, a presentation of information indicative of the media function via an audio signal on the first communication device during a ring-back cycle.

15. The method of claim 13, further comprising: retrieving, by the system, information from the first user profile including retrieving preference data indicative of a portion of the device-related feature data that is to be masked.

16. The method of claim 13, wherein the facilitating includes recording the data associated with the communication.

17. The non-transitory computer readable storage medium of claim 12, wherein the operations further comprise:

auditing, by the system, the first communication device, the second communication device, and the set of communication networks with a third communication device, including determining a compatibility of the second communication device and the third communication device to communicate with the first communication device, in response to the third communication device being added to the communication.

18. The system of claim 11, wherein the operations further comprise: querying the originating device to determine that the second data associated with the communication is to be stored within the memory.

19. The non-transitory computer readable storage medium of claim 12, wherein the operations further comprise:

facilitating a presentation of information indicative of the media function via an audio signal on the first communication device during a ring-back cycle.

20. The non-transitory computer readable storage medium of claim 12, wherein the facilitating includes recording the data associated with the communication.

\* \* \* \* \*